(12) United States Patent
Tanaka et al.

(10) Patent No.: US 11,125,985 B2
(45) Date of Patent: Sep. 21, 2021

(54) ZOOM LENS AND IMAGING APPARATUS

(71) Applicant: FUJIFILM Corporation, Tokyo (JP)

(72) Inventors: Takuya Tanaka, Saitama (JP); Takuya Tanaka, Saitama (JP)

(73) Assignee: FUJIFILM Corporation, Tokyo (JP)

(*) Notice: Subject to any disclaimer, the term of this patent is extended or adjusted under 35 U.S.C. 154(b) by 36 days.

(21) Appl. No.: 16/826,822

(22) Filed: Mar. 23, 2020

(65) Prior Publication Data

US 2020/0310085 A1 Oct. 1, 2020

(30) Foreign Application Priority Data

Mar. 26, 2019 (JP) .............................. JP2019-059475

(51) Int. Cl.
*G02B 15/14* (2006.01)
*G02B 27/00* (2006.01)

(52) U.S. Cl.
CPC . *G02B 15/1451* (2019.08); *G02B 15/145125* (2019.08); *G02B 15/145129* (2019.08); *G02B 27/0025* (2013.01)

(58) Field of Classification Search
CPC .............. G02B 27/0025; G02B 27/005; G02B 15/1451; G02B 15/145125; G02B 15/145129
See application file for complete search history.

(56) References Cited

U.S. PATENT DOCUMENTS 10,746,976 B2 * 8/2020 Ota ..................... G02B 15/173
10,838,180 B2 * 11/2020 Tanaka .................. G02B 15/20

FOREIGN PATENT DOCUMENTS

JP      2017-078770 A    4/2017
JP      2017-181719 A   10/2017

* cited by examiner

*Primary Examiner* — Jack Dinh
(74) *Attorney, Agent, or Firm* — Studebaker & Brackett PC

(57) ABSTRACT

The zoom lens consists of, in order from an object side, a positive first lens group, a negative second lens group, a third lens group, a positive fourth lens group, and a positive fifth lens group. During zooming, the second lens group, the third lens group, and the fourth lens group move. The second lens group has a negative lens and a cemented lens successively in order from a most object side to an image side. The cemented lens of the second lens group has a first negative lens and a first positive lens successively in order from an object side to an image side. A predetermined conditional expression for the first positive lens is satisfied.

19 Claims, 12 Drawing Sheets

FIG. 2
EXAMPLE 1
WIDE
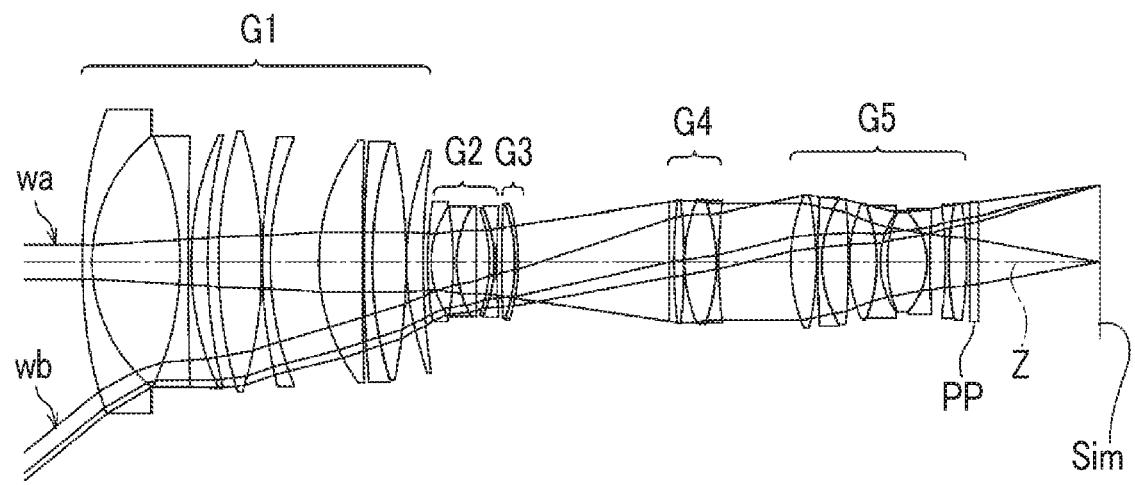
TELE
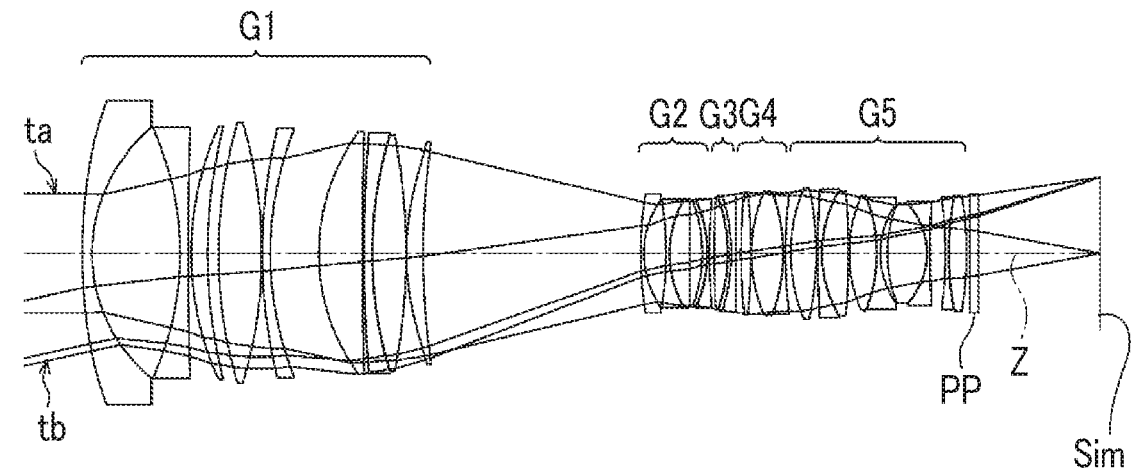

EXAMPLE 1

EXAMPLE 2

FIG. 5
EXAMPLE 2
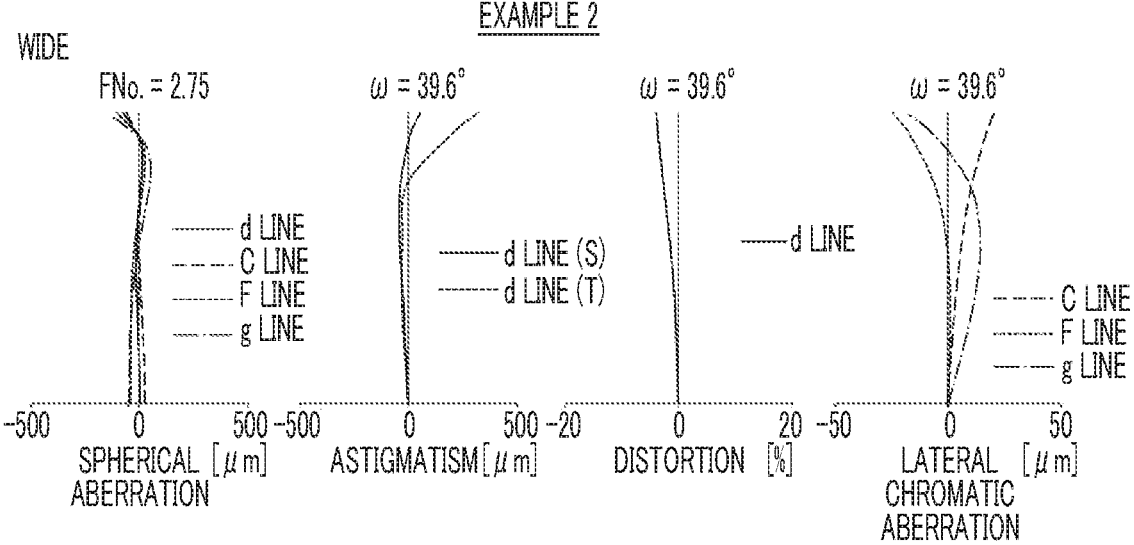
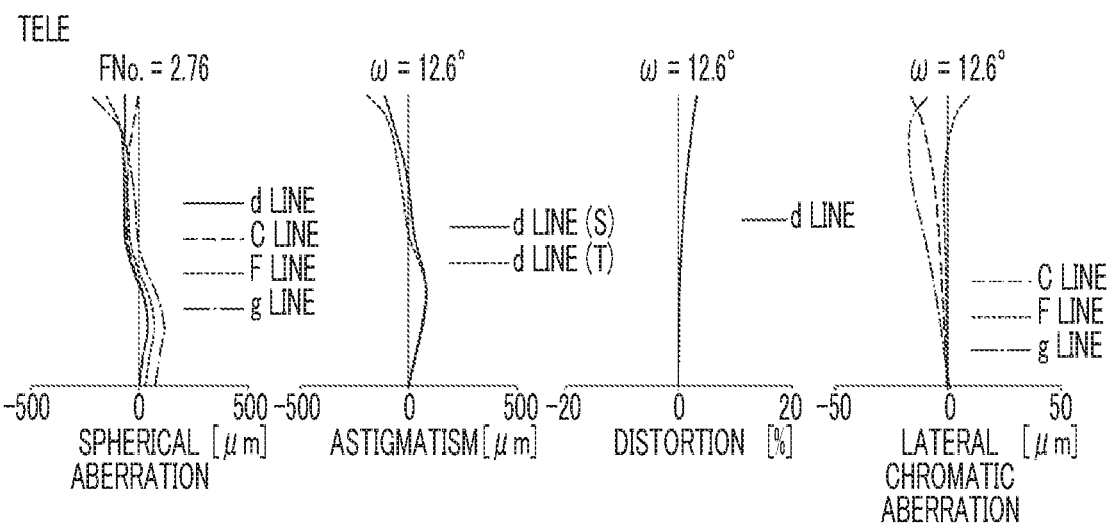

EXAMPLE 3

EXAMPLE 4

EXAMPLE 5

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2019-059475, filed on Mar. 26, 2019. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, a five-group lens system is known as a zoom lens used in a broadcast camera, a movie camera, a digital camera, and the like. For example, each of JP2017-181719A and JP2017-078770A discloses a zoom lens which comprises, in order from an object side to an image side, a first lens group having a positive refractive power, a second lens group, a third lens group having a positive refractive power, a fourth lens group having a positive refractive power, and a fifth lens group, and in which the second lens group, the third lens group, and the fourth lens group move during zooming.

SUMMARY OF THE INVENTION

In recent years, a camera with a larger sensor size than the related art has been used in order to obtain a high image quality, and there is a need for a lens system having a large image circle for corresponding with such a camera. On the other hand, there is an increasing demand for image definition, and the lens system is required to have optical performance for corresponding with a pixel pitch equal to or less than the related art even in a case where the sensor size increases.

The lens system described in each of JP2017-181719A and JP2017-078770A has a small image circle, and in a case where this lens system is proportionally enlarged so as to correspond with an image circle having a size desired in recent years, an off-axis aberration increases with the enlargement of the lens system, and a lateral chromatic aberration is particularly noticeable.

The present disclosure has been made in view of the above circumstances, and an object thereof is to provide a zoom lens that holds favorable optical performance while having a large image circle, and an imaging apparatus comprising the zoom lens.

A zoom lens according to an aspect of the present disclosure consists of, in order from an object side to an image side: a first lens group that has a positive refractive power; a second lens group that has a negative refractive power; a third lens group that has a refractive power; a fourth lens group that has a positive refractive power; and a fifth lens group that has a positive refractive power, wherein during zooming from a wide-angle end to a telephoto end, the first lens group and the fifth lens group remain stationary with respect to an image plane, the second lens group moves to an image side, and the third lens group and the fourth lens group move along an optical axis while changing a distance with each of adjacent lens groups, wherein the second lens group has, successively in order from a most object side to an image side, a negative lens and a cemented lens, wherein the cemented lens has, successively in order from an object side to an image side, a first negative lens and a first positive lens, and wherein assuming that a refractive index of the first positive lens with respect to a d line is Np and an Abbe number of the first positive lens based on a d line is vp, the following Conditional Expression (1) is satisfied.

$$0.05 < 0.00816 \times vp - 2.040724 + Np < 0.5 \quad (1)$$

In the zoom lens of the above described aspect, it is preferable that the following Conditional Expression (1-1) is satisfied.

$$0.1 < 0.00816 \times vp - 2.040724 + Np < 0.4 \quad (1\text{-}1)$$

In the zoom lens of the above described aspect, assuming that an Abbe number of the first negative lens based on a d line is vn, it is preferable that the following Conditional Expression (2) is satisfied and it is more preferable that the following Conditional Expression (2-1) is satisfied.

$$60 < vn < 105 \quad (2)$$

$$65 < vn < 100 \quad (2\text{-}1)$$

In the zoom lens of the above described aspect, assuming that a refractive index of the first positive lens with respect to a d line is Np, it is preferable that the following Conditional Expression (3) is satisfied and it is more preferable that the following Conditional Expression (3-1) is satisfied.

$$1.9 < Np < 2.2 \quad (3)$$

$$1.95 < Np < 2.2 \quad (3\text{-}1)$$

In the zoom lens of the above described aspect, assuming that an Abbe number of the first positive lens based on a d line is vp, it is preferable that the following Conditional Expression (4) is satisfied and it is more preferable that the following Conditional Expression (4-1) is satisfied.

$$25 < vp < 60 \quad (4)$$

$$26.5 < vp < 60 \quad (4\text{-}1)$$

In the zoom lens of the above described aspect, it is preferable that stop is disposed in the fourth lens group and a distance between the fourth lens group and the fifth lens group at a wide-angle end is longer than a distance between the fourth lens group and the fifth lens group at a telephoto end. In such a configuration, assuming that a lateral magnification of the fourth lens group in a state of being focused on an object at infinity is β4, it is preferable that the following Conditional Expression (5) is satisfied and it is more preferable that the following Conditional Expression (5-1) is satisfied.

$$-0.3 < 1/\beta 4 < 0 \quad (5)$$

$$-0.2 < 1/\beta 4 < 0 \quad (5\text{-}1)$$

In the zoom lens of the above described aspect, in a state of being focused on an object at infinity, assuming that a focal length of the second lens group is f2 and a focal length of the zoom lens at a wide-angle end is fw, it is preferable that the following Conditional Expression (6) is satisfied and it is more preferable that the following Conditional Expression (6-1) is satisfied.

$$-3 < f2/fw < 0 \quad (6)$$

$$-2.5 < f2/fw < -0.5 \quad (6\text{-}1)$$

In the zoom lens of the above described aspect, in a state of being focused on an object at infinity, assuming that a focal length of the first lens group is f1 and a focal length of the second lens group is f2, it is preferable that the following Conditional Expression (7) is satisfied and it is more preferable that the following Conditional Expression (7-1) is satisfied.

$$-5 < f1/f2 < 0 \quad (7)$$

$$-4 < f1/f2 < -0.5 \quad (7\text{-}1)$$

In the zoom lens of the above described aspect, it is preferable that the first lens group consists of, in order from an object side to an image side, a first a lens group that remains stationary with respect to an image plane during focusing and has a negative refractive power, a first b lens group that moves along an optical axis during focusing and has a positive refractive power, and a first c lens group that remains stationary with respect to an image plane during focusing and has a positive refractive power. In such a configuration, assuming that a focal length of the first c lens group is f1c and a focal length of the second lens group is f2, it is preferable that the following Conditional Expression (8) is satisfied and it is more preferable that the following Conditional Expression (8-1) is satisfied.

$$-5 < f1c/f2 < 0 \quad (8)$$

$$-4 < f1c/f2 < -0.5 \quad (8\text{-}1)$$

An imaging apparatus according to another aspect of the present disclosure comprises the zoom lens of the above described aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the term "~ group having a negative refractive power" means that the group has a negative refractive power as a whole. The term "a lens having a positive refractive power" and the term "a positive lens" are synonymous. The term "a lens having a negative refractive power" and the term "a negative lens" are synonymous. The "lens group" is not limited to a configuration using a plurality of lenses, and may consist of only one lens.

The sign of the refractive power and the surface shape of a lens including an aspheric surface are considered in terms of the paraxial region unless otherwise noted. A compound aspheric lens (a lens which is integrally composed of a spherical lens and a film having an aspheric shape formed on the spherical lens, and functions as one aspheric lens as a whole) is not considered as a cemented lens, and is treated as a single lens.

The "focal length" used in a conditional expression is a paraxial focal length. The value used in a conditional expression is a value in the case of using a d line as a reference in a state of being focused on an object at infinity, in addition to a partial dispersion ratio. Assuming that refractive indexes of a lens with respect to a g line, an F line, and a C line are Ng, NF, and NC, respectively, a partial dispersion ratio θgF between the g line and the F line of the lens is defined as θgF=(Ng−NF)/(NF−NC). The "d line", "C line", "F line", and "g line" described in this specification are bright lines, the wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers).

According to the present disclosure, it is possible to provide a zoom lens that holds favorable optical performance while having a large image circle, and an imaging apparatus comprising the zoom lens.

BRIEF DESCRIPTION OF THE DRAWINGS

FIG. 2 is a cross-sectional view showing configurations and rays of the zoom lens shown in FIG. 1 in each zoom state.

FIG. 5 shows respective aberration diagrams of the zoom lens according to Example 2 of the present disclosure.

DESCRIPTION OF THE PREFERRED EMBODIMENTS

Figure 1:
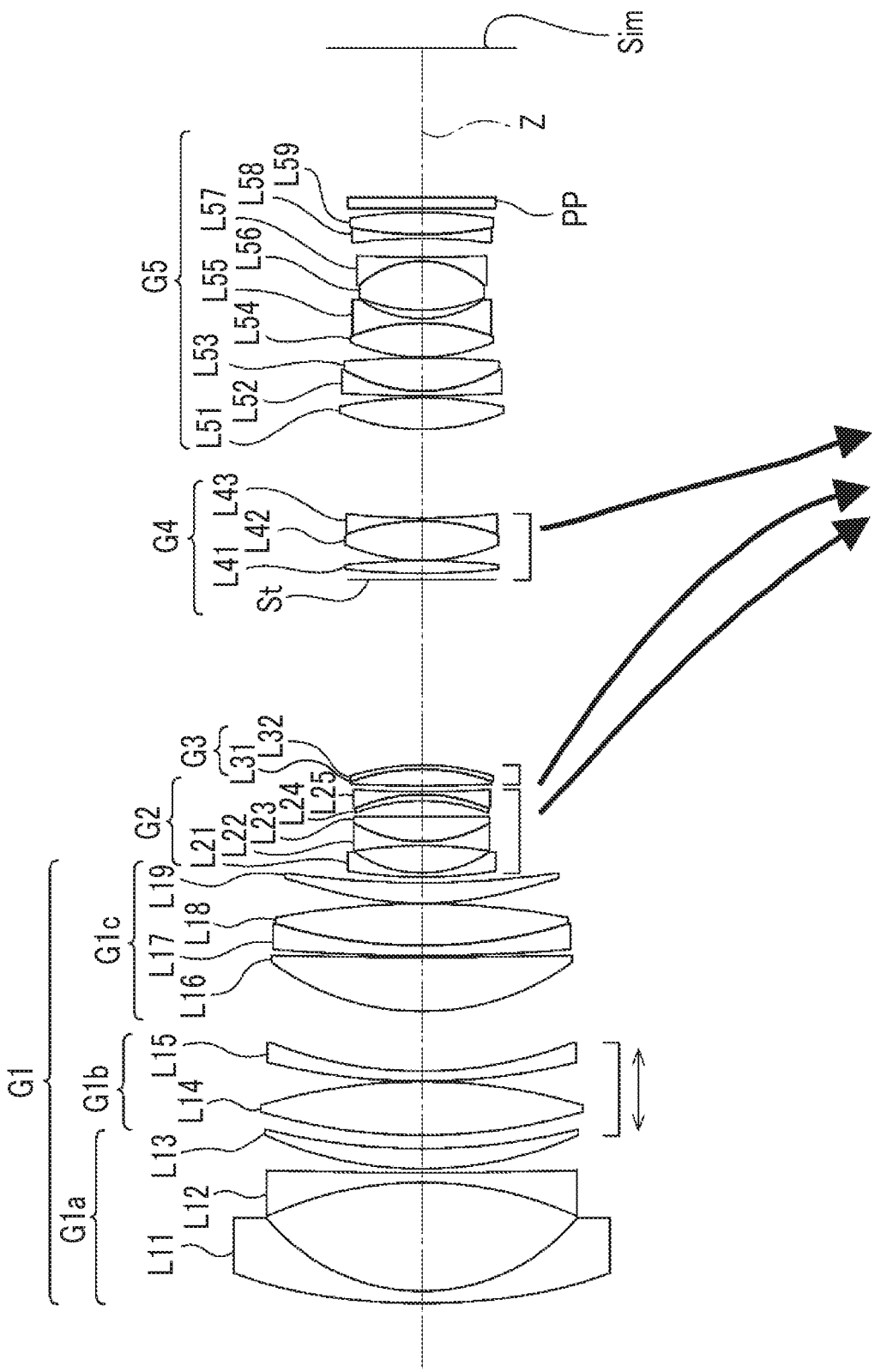
FIG. 1 is a diagram showing a cross-sectional view of a configuration of a zoom lens according to an embodiment of the present disclosure and a movement locus thereof, corresponding to a zoom lens of Example 1 of the present disclosure.

Hereinafter, embodiments of a zoom lens of the present disclosure will be described in detail with reference to the drawings. FIG. 1 is a diagram showing a cross-sectional view of a configuration and a movement locus of a zoom lens according to an embodiment of the present disclosure at a wide-angle end. FIG. 2 is a cross-sectional view showing configurations and rays of the zoom lens in each zoom state. The example shown in FIGS. 1 and 2 correspond to a zoom lens of Example 1 to be described later. FIGS. 1 and 2 show states of being focused on an object at infinity, a left side thereof is an object side, and a right side thereof is an image side. In FIG. 2, an upper part labeled by "WIDE" shows a wide-angle end state, and a lower part labeled by "TELE" shows a telephoto end state. FIG. 2 shows rays including on-axis rays wa and rays with the maximum angle of view wb in a wide-angle end state, and on-axis rays ta and rays with the maximum angle of view tb in a telephoto end state. Hereinafter, description will be given mainly with reference to FIG. 1.

FIG. 1 shows an example in which, assuming that a zoom lens is applied to an imaging apparatus, an optical member PP having a parallel plate shape is disposed between the zoom lens and an image plane Sim. The optical member PP is a member assumed to include various filters, a cover glass, and/or the like. The various filters include, for example, a low pass filter, an infrared cut filter, a filter that cuts a specific wavelength region, and the like. The optical member PP has no refractive power, and in the present disclosure, the optical member PP may be omitted.

The zoom lens of the present disclosure consists of, in order from an object side to an image side along an optical axis Z, a first lens group G1 that has a positive refractive power, a second lens group G2 that has a negative refractive power, a third lens group G3 that has a refractive power, a fourth lens group G4 that has a positive refractive power, and a fifth lens group G5 that has a positive refractive power. By configuring a most-object-side first lens group G1 with a positive lens group, an overall length of a lens system can be shortened, which is advantageous for downsizing. In addition, by configuring a most-image-side fifth lens group G5 with a positive lens group, it is possible to suppress an increase in an incidence angle of a principal ray of an off-axis ray to an image plane Sim, thereby to suppress shading.

In the example shown in FIG. 1, the first lens group G1 consists of nine lenses L11 to L19 in order from an object side to an image side, the second lens group G2 consists of five lenses L21 to L25 in order from an object side to an image side, the third lens group G3 consists of two lenses L31 and L32 in order from an object side to an image side, the fourth lens group G4 consists of an aperture stop St and three lenses L41 to L43 in order from an object side to an image side, and the fifth lens group G5 consists of nine lenses L51 and L59 in order from an object side to an image side. Meanwhile, in the zoom lens of the present disclosure, the number of lenses composing each lens group may be different from the number in the example shown in FIG. 1. In addition, the aperture stop St shown in FIG. 1 does not show its shape, but shows its position in a direction of an optical axis.

In the zoom lens of the present disclosure, it is configured such that during zooming from a wide-angle end to a telephoto end, the first lens group G1 and the fifth lens group G5 remain stationary with respect to an image plane Sim, the second lens group G2 always moves to an image side, and the third lens group G3 and the fourth lens group G4 move along an optical axis Z while changing a distance with each of adjacent lens groups. In FIG. 1, under the second lens group G2, the third lens group G3, and the fourth lens group G4, movement loci of the respective lens groups during zooming from a wide-angle end to a telephoto end are schematically indicated by arrows. It is possible that main zooming is performed by moving the second lens group G2 having a negative refractive power, and fluctuation in an image plane position due to zooming is corrected by moving the third lens group G3 and the fourth lens group G4. Since the third lens group G3 and the fourth lens group G4 move relatively during zooming, it is easy to favorably suppress fluctuation in a field curvature during zooming and fluctuation in a spherical aberration during zooming. In addition, the first lens group G1 and the fifth lens group G5 are configured to remain stationary during zooming. In such a configuration, a distance from a most-object-side lens surface to a most-image-side lens surface does not change during zooming, and it is possible to reduce fluctuation in barycenter of a lens system. Thus, it is possible to improve the convenience at the time of imaging.

The zoom lens according to the present disclosure favorably suppresses various aberrations including a chromatic aberration by suitably setting a configuration of the second lens group G2. The second lens group G2 has a negative lens and a cemented lens successively in order from a most object side to an image side. This cemented lens disposed adjacent to a most-object-side negative lens of the second lens group G2 has a negative lens and a positive lens successively in order from an object side to an image side. That is, the cemented lens of the second lens group G2 has a configuration in which a negative lens and a positive lens are cemented in order from an object side. By disposing a plurality of negative lenses on an object side in the second lens group G2, an object side principal point position of the second lens group G2 is positioned on an object side so as to be closer to the first lens group G1, and thus a high zoom ratio can be achieved. In addition, in such a case, a lateral chromatic aberration on a wide angle side is likely to occur, and is particularly prominent in an optical system having a large image circle. Therefore, correction of a lateral chromatic aberration can be facilitated by configuring the second lens group G2 to include a cemented lens in which a negative lens and a positive lens are cemented to each other.

The cemented lens of the second lens group G2 may be a cemented lens consisting of two lenses or may be a cemented lens consisting of three lenses. In a case of a cemented lens consisting of two lenses, it is advantageous for downsizing. Hereinafter, for convenience of explanation, the negative lens and the positive lens that the cemented lens of the second lens group G2 has successively in order from an object side to an image side are referred to as a first negative lens and a first positive lens, respectively. As an example, in the example shown in FIG. 1, the lens L22 corresponds to the first negative lens, and the lens L23 corresponds to the first positive lens.

Assuming that a refractive index of the first positive lens with respect to the d line is Np and an Abbe number of the first positive lens with respect to the d line is vp, it is configured such that the following Conditional Expression (1) is satisfied. By allowing Conditional Expression (1) to be satisfied, a radius of curvature of the first positive lens can be appropriately set, and thus a lateral chromatic aberration generated by the first negative lens can be appropriately corrected by the first positive lens. The details are as follows. By not allowing the result of Conditional Expression (1) to be equal to or less than a lower limit, an absolute value of a radius of curvature of the first positive lens is prevented from becoming excessively small. As a result, it is possible to suppress an increase in a difference between a lateral chromatic aberration at a high angle of view and a lateral chromatic aberration at a low angle of view in a case where a lateral chromatic aberration generated by the first negative lens is corrected by the first positive lens. In addition, by not allowing the result of Conditional Expression (1) to be equal to or less than a lower limit, a difference between an Abbe number of the first negative lens and an Abbe number of the first positive lens can be suppressed. As a result, it is possible to suppress overcorrection of a lateral chromatic aberration at a low angle of view. By not allowing the result of Conditional Expression (1) to be equal to or greater than an upper limit, an absolute value of a radius of curvature of the first positive lens is prevented from becoming excessively large. As a result, it is possible to suppress insufficient correction in a case where a lateral chromatic aberration generated by the first negative lens is corrected by the first positive lens. In addition, by not allowing the result of Conditional Expression (1) to be equal to or greater than an upper limit, a difference between an Abbe number of the first negative lens and an Abbe number of the first positive lens is prevented from becoming excessively small. As a result, it is possible to suppress insufficient correction of a lateral chromatic aberration. Further, in a case of a configuration in which the following Conditional Expression (1-1) is satisfied, it is possible to obtain more favorable characteristics, and in a case of a configuration in which the following Conditional Expression (1-2) is satisfied, it is possible to obtain still more favorable characteristics.

$$0.05 < 0.00816 \times vp - 2.040724 + Np < 0.5 \quad (1)$$

$$0.1 < 0.00816 \times vp - 2.040724 + Np < 0.4 \quad (1\text{-}1)$$

$$0.15 < 0.00816 \times vp - 2.040724 + Np < 0.3 \quad (1\text{-}2)$$

Assuming that an Abbe number of the first negative lens based on the d line is vn, it is preferable that the following Conditional Expression (2) is satisfied. By not allowing the result of Conditional Expression (2) to be equal to or less than a lower limit, it is possible to suppress occurrence of a lateral chromatic aberration on a wide angle side. By not allowing the result of Conditional Expression (2) to be equal to or greater than an upper limit, it is easy to appropriately correct a secondary spectrum of a lateral chromatic aberration on a wide angle side. In addition, in a case of a configuration in which the following Conditional Expression (2-1) is satisfied, it is possible to obtain more favorable characteristics.

$$60 < vn < 105 \quad (2)$$

$$65 < vn < 100 \quad (2\text{-}1)$$

Assuming that a refractive index of the first positive lens with respect to the d line is Np, it is preferable that the following Conditional Expression (3) is satisfied. By not allowing the result of Conditional Expression (3) to be equal to or less than a lower limit, it is easy to appropriately correct a distortion on a wide angle side. In addition, by not allowing the result of Conditional Expression (3) to be equal to or less than a lower limit, it is easy to suppress fluctuation in a spherical aberration during zooming by a cemented surface of the first negative lens and the first positive lens. By not allowing the result of Conditional Expression (3) to be equal to or greater than an upper limit, an off-axis aberration at a low angle of view generated by the first negative lens can be appropriately corrected by the first positive lens. In addition, in a case of a configuration in which the following Conditional Expression (3-1) is satisfied, it is possible to obtain more favorable characteristics.

$$1.9 < Np < 2.2 \quad (3)$$

$$1.95 < Np < 2.2 \quad (3\text{-}1)$$

In addition, assuming that an Abbe number of the first positive lens based on the d line is vp, it is preferable that the following Conditional Expression (4) is satisfied. By not allowing the result of Conditional Expression (4) to be equal to or less than a lower limit, it is easy to appropriately correct an on-axis chromatic aberration on a telephoto side, which is advantageous for reducing the F number. By not allowing the result of Conditional Expression (4) to be equal to or greater than an upper limit, it is easy to appropriately correct a lateral chromatic aberration on a wide angle side. In addition, in a case of a configuration in which the following Conditional Expression (4-1) is satisfied, it is possible to obtain more favorable characteristics.

$$25 < vp < 60 \quad (4)$$

$$26.5 < vp < 60 \quad (4\text{-}1)$$

Regarding a refractive power of the second lens group G2, it is preferable that the following conditional expression is satisfied. In a state of being focused on an object at infinity, assuming that a focal length of the second lens group G2 is f2 and a focal length of the zoom lens at a wide-angle end is fw, it is preferable that the following Conditional Expression (6) is satisfied. By not allowing the result of Conditional Expression (6) to be equal to or less than a lower limit, it is possible to reduce the amount of movement of the second lens group G2 required for zooming, which is advantageous for downsizing. By not allowing the result of Conditional Expression (6) to be equal to or greater than an upper limit, it is easy to suppress fluctuation in various off-axis aberrations on a wide angle side during zooming, and in particular, fluctuation in a distortion and a field curvature, and to suppress fluctuation in various aberrations on a telephoto side during zooming, and in particular, fluctuation in a spherical aberration. Further, in a case of a configuration in which the following Conditional Expression (6-1) is satisfied, it is possible to obtain more favorable characteristics, and in a case of a configuration in which the following Conditional Expression (6-2) is satisfied, it is possible to obtain still more favorable characteristics.

$$-3 < f2/fw < 0 \quad (6)$$

$$-2.5 < f2/fw < -0.5 \quad (6\text{-}1)$$

$$-2 < f2/fw < -0.5 \quad (6\text{-}2)$$

In a state of being focused on an object at infinity, assuming that a focal length of the first lens group G1 is f1 and a focal length of the second lens group G2 is f2, it is preferable that the following Conditional Expression (7) is satisfied. By not allowing the result of Conditional Expression (7) to be equal to or less than a lower limit, it is possible to downsize the first lens group G1 and it is easy to suppress fluctuation in an aberration such as a spherical aberration and an on-axis chromatic aberration during zooming. By not allowing the result of Conditional Expression (7) to be equal to or greater than an upper limit, it is possible to correct a spherical aberration and an on-axis chromatic aberration at a telephoto end and to reduce the amount of movement of the second lens group G2 required for zooming, which is advantageous for downsizing. Further, in a case of a configuration in which the following Conditional Expression (7-1) is satisfied, it is possible to obtain more favorable characteristics, and in a case of a configuration in which the following Conditional Expression (7-2) is satisfied, it is possible to obtain still more favorable characteristics.

$$-5 < f1/f2 < 0 \quad (7)$$

$$-4 < f1/f2 < -0.5 \quad (7\text{-}1)$$

$$-3.5 < f1/f2 < -1 \quad (7\text{-}2)$$

Next, preferable configurations of the lens groups other than the second lens group G2 will be described. It is preferably configured such that the first lens group G1 consists of, in order from an object side to an image side, a first a lens group G1a that remains stationary with respect to an image plane Sim during focusing and has a negative refractive power, a first b lens group G1b that moves along an optical axis Z during focusing and has a positive refractive power, and a first c lens group G1c that remains stationary with respect to an image plane Sim during focusing and has a positive refractive power. With such a configuration, it is easy to reduce a spherical aberration and an on-axis chromatic aberration that occur during focusing. A horizontal double-headed arrow noted below the first b lens group G1b in FIG. 1 indicates that the first b lens group G1b is a focus lens group that moves during focusing.

As an example, in the example shown in FIG. 1, the first a lens group G1a consists of three lenses L11 to L13 in order from an object side to an image side, the first b lens group G1b consists of two lenses L14 and L15 in order from an object side to an image side, and the first c lens group G1c consists of four lenses L16 to L19 in order from an object side to an image side. Meanwhile, in the zoom lens of the present disclosure, the number of lenses composing each lens group may be different from the number in the example shown in FIG. 1.

In a configuration in which the first lens group G1 consists of the above-described first a lens group G1a, first b lens group G1b, and first c lens group G1c, in a case where a focal length of the first c lens group is f1c and a focal length of the second lens group G2 is f2, it is preferable that the following Conditional Expression (8) is satisfied. By allowing Conditional Expression (8) to be satisfied, an effect relating to Conditional Expression (7) can be enhanced. That is, by not allowing the result of Conditional Expression (8) to be equal to or less than a lower limit, it is more possible to downsize the first lens group G1 and it is easier to suppress fluctuation in an aberration such as a spherical aberration and an on-axis chromatic aberration during zooming. By not allowing the result of Conditional Expression (8) to be equal to or greater than an upper limit, it is more possible to correct a spherical aberration and an on-axis chromatic aberration at a telephoto end and it is possible to more reduce the amount of movement of the second lens group G2 required for zooming, which is more advantageous for downsizing. Further, in a case of a configuration in which the following Conditional Expression (8-1) is satisfied, it is possible to obtain more favorable characteristics, and in a case of a configuration in which the following Conditional Expression (8-2) is satisfied, it is possible to obtain still more favorable characteristics.

$$-5 < f1c/f2 < 0 \tag{8}$$

$$-4 < f1c/f2 < -0.5 \tag{8-1}$$

$$-3.5 < f1c/f2 < -1 \tag{8-2}$$

In addition, in a case where the first lens group G1 consists of the above-described first a lens group G1a, first b lens group G1b, and first c lens group G1c, it is preferably configured such that a most-image-side lens of the first b lens group G1b is a negative meniscus lens having a convex surface facing an object side, and an absolute value of a radius of curvature of a surface, of a most-object-side lens of the first c lens group G1c, on an object side is smaller than an absolute value of a radius of curvature of a surface, of the most-image-side lens of the first b lens group G1b, on an image side. By configuring the most-image-side lens of the first b lens group G1b as the above, it is easy to suppress occurrence of an astigmatism and a field curvature on a wide angle side. By configuring the surfaces of the first b lens group G1b and the first c lens group G1c, which face each other as the above, it is easy to suppress fluctuation in an off-axis aberration during focusing. In addition, since the first b lens group G1b and the first c lens group G1c do not interfere with each other at a lens edge part during focusing, it is easy to secure the amount of movement of the first b lens group G1b during focusing. In addition, it is preferable that the first b lens group G1b consists of, in order from an object side to an image side, a positive lens having a convex surface facing an object side and a negative meniscus lens having a convex surface facing an object side. In such a case, it is easy to suppress fluctuation in an off-axis aberration during focusing.

The third lens group G3 may be a lens group having a positive refractive power or may be a lens group having a negative refractive power. In a case where the third lens group G3 has a positive refractive power, a refractive power of the fourth lens group G4 can be weakened, and thus performance deterioration due to tilting of the lens group and/or performance deterioration due to a manufacturing error of the lens can be suppressed. In a case where the third lens group G3 has a negative refractive power, it is advantageous for increasing a zoom ratio.

It is preferable that the aperture stop St is disposed in the fourth lens group G4, and a distance between the fourth lens group G4 and the fifth lens group G5 at a wide-angle end is longer than a distance between the fourth lens group G4 and the fifth lens group G5 at a telephoto end. In such a case, it is possible to position a position of the aperture stop St at a wide-angle end closer to the object side than a position of the aperture stop St at a telephoto end, and thus it is possible to position an entrance pupil position at a wide-angle end closer to an object side than an entrance pupil position at a telephoto end. Accordingly, it is easy to suppress increase in an outer diameter of the first lens group G1 while inhibiting an overall length of the lens system from becoming long.

In a case where the aperture stop St is disposed in the fourth lens group G4, and a distance between the fourth lens group G4 and the fifth lens group G5 at a wide-angle end is longer than a distance between the fourth lens group G4 and the fifth lens group G5 at a telephoto end, assuming that a lateral magnification of the fourth lens group G4 in a state of being focused on an object at infinity is β4, it is preferable that the following Conditional Expression (5) is satisfied. In a configuration in which a lens diameter is suppressed so that an outer diameter of the lens does not become too large, in a case of zooming from a wide-angle end to a telephoto end, on-axis rays are limited by a lens diameter of the first lens group G1 and thus a phenomenon that F number increases may occur. By not allowing the result of Conditional Expression (5) to be equal to or less than a lower limit, it is easy to appropriately suppress fluctuation in an F number in a case of zooming in a zooming range from a wide-angle end to a focal length at which the above-described phenomenon occurs. By not allowing the result of Conditional Expression (5) to be equal to or greater than an upper limit, a refractive power of the fifth lens group G5 is allowed to be prevented from becoming excessively strong. As a result, it is easy to suppress occurrence of an off-axis aberration. Further, in a case of a configuration in which Conditional Expression (5-1) is satisfied, it is possible to obtain more favorable characteristics, and in a case of a configuration in which Conditional Expression (5-2) is satisfied, it is possible to obtain still more favorable characteristics.

$$-0.3 < 1/\beta 4 < 0 \tag{5}$$

$$-0.2 < 1/\beta 4 < 0 \tag{5-1}$$

$$-0.1 < 1/\beta 4 < 0 \tag{5-2}$$

The above-mentioned preferred configurations and available configurations may be optional combinations, and it is preferable to selectively adopt the configurations in accordance with required specification. According to technology of the present disclosure, it is possible to realize a zoom lens that holds favorable optical performance while having a large image circle. Further, "a large image circle" means that an image circle having a diameter larger than 43.2.

Next, numerical examples of the zoom lens of the present disclosure will be described.

Example 1

FIG. 1 shows a configuration and movement locus of a zoom lens of Example 1, and an illustration method and a configuration thereof is as described above. Therefore, repeated description is partially omitted herein. The zoom lens of Example 1 consists of, in order from an object side to an image side, a first lens group G1 that has a positive refractive power, a second lens group G2 that has a negative refractive power, a third lens group G3 that has a positive refractive power, a fourth lens group G4 that has a positive refractive power, and a fifth lens group G5 that has a positive refractive power. During zooming, the first lens group G1 and the fifth lens group G5 remain stationary with respect to an image plane Sim, and the second lens group G2, the third lens group G3, and the fourth lens group G4 move along an optical axis Z while changing a distance with each of adjacent lens groups. The first lens group G1 consists of, in order from an object side to an image side, a first a lens group G1a having a negative refractive power, a first b lens group G1b having a positive refractive power, and a first c lens group G1c having a positive refractive power. During focusing, only the first b lens group G1b moves along an optical axis Z, and all other lens groups remain stationary with respect to an image plane Sim. The first a lens group G1a consists of three lenses L11 to L13 in order from an object side to an image side, the first b lens group G1b consists of two lenses L14 and L15 in order from an object side to an image side, the first c lens group G1c consists of four lenses L16 to L19 in order from an object side to an image side, the second lens group G2 consists of five lenses L21 to L25 in order from an object side to an image side, the third lens group G3 consists of two lenses L31 and L32 in order from an object side to an image side, the fourth lens group G4 consists of an aperture stop St and three lenses L41 to L43 in order from an object side to an image side, and the fifth lens group G5 consists of nine lenses L51 and L59 in order from an object side to an image side. An outline of the zoom lens of Example 1 has been described above.

Regarding the zoom lens of Example 1, Tables 1A and 1B show basic lens data thereof, Table 2 shows specification and variable surface distances thereof, and Table 3 shows aspheric coefficients thereof. Here, the basic lens data is displayed to be divided into two tables of Table 1A and Table 1B in order to prevent one table from becoming long. Table 1A shows the first lens group G1, the second lens group G2, and the third lens group G3, and Table 1B shows the fourth lens group G4, the fifth lens group G5, and the optical member PP. Tables 1A, 1B, and 2 show data in a state of being focused on an object at infinity.

In Tables 1A and 1B, the column of Sn shows a surface number. A most-object-side surface is the first surface, and the surface numbers increase one by one toward an image side. The column of R shows radii of curvature of the respective surfaces. The column of D shows surface distances on an optical axis between the respective surfaces and the surfaces adjacent to an image side. The column of Nd shows a refractive index of each constituent element with respect to the d line, the column of vd shows an Abbe number of each constituent element based on the d line, and the column of θgF shows a partial dispersion ratio between the g line and the F line of each constituent element.

In Tables 1A and 1B, a sign of a radius of curvature of a surface having a convex surface facing an object side is positive and a sign of a radius of curvature of a surface having a convex surface facing an image side is negative. Table 1B also shows the aperture stop St and the optical member PP. In Table 1B, in the column of a surface number of a surface corresponding to the aperture stop St, the surface number and a term of (St) are noted. In Tables 1A and 1B, the variable surface distances during zooming are referenced by reference signs DD[ ], and are written into columns of D, where object side surface numbers of distances are noted in [ ].

In Table 2, values of a zoom ratio Zr, a focal length f, an F number FNo., a maximum total angle of view 2ω, a maximum image height IH, and a variable surface distance during zooming are shown based on the d line. (°) in the column of 2ω indicates that a unit thereof is a degree. In Table 2, values in a wide-angle end state and a telephoto end state are respectively shown in the columns labeled by WIDE and TELE.

In the basic lens data, a surface number of an aspheric surface is marked with *, and the numerical value of a paraxial radius of curvature is described in the column of a radius of curvature of the aspheric surface. In Table 3, a surface number of an aspheric surface is shown in the column of Sn, and the numerical value of the aspheric coefficient for each aspheric surface is shown in the columns of KA and Am (m is an integer of 3 or more and varies depending on the surface). The numerical value "E±n" (n: integer) of the aspheric coefficient in Table 3 means "×10$^{±n}$". KA and Am are aspheric coefficients in an aspheric expression represented by the following expression.

$$Zd = C \times h^2 / \{1 + (1 - KA \times C^2 \times h^2)^{1/2}\} + \Sigma Am \times h^m,$$

Where,
Zd: aspheric depth (a length of a perpendicular line drawn from a point on an aspheric surface of a height h to a plane perpendicular to an optical axis in contact with an aspheric vertex)
h: height (a distance from an optical axis to a lens surface)
C: reciprocal of paraxial radius of curvature
KA, Am: aspheric coefficient, and
Σ in the aspheric expression means the sum of m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

| | Example 1 | | | | |
|---|---|---|---|---|---|
| Sn | R | D | Nd | vd | θgF |
| *1 | 182.95915 | 2.900 | 1.77250 | 49.60 | 0.55212 |
| 2 | 49.51163 | 26.465 | | | |
| 3 | −91.62241 | 2.399 | 1.55032 | 75.50 | 0.54001 |
| 4 | 1344.71083 | 0.914 | | | |

TABLE 1A-continued

Example 1

| Sn | R | D | Nd | vd | θgF |
|---|---|---|---|---|---|
| 5 | 94.04762 | 4.917 | 1.53996 | 59.46 | 0.54418 |
| 6 | 158.65490 | 3.275 | | | |
| 7 | 140.46549 | 13.012 | 1.43700 | 95.10 | 0.53364 |
| 8 | −138.89070 | 0.126 | | | |
| 9 | 159.36792 | 2.399 | 1.84666 | 23.78 | 0.61923 |
| 10 | 101.97521 | 14.569 | | | |
| 11 | 62.95592 | 13.112 | 1.43700 | 95.10 | 0.53364 |
| 12 | 1369.37943 | 0.500 | | | |
| 13 | 461.49776 | 2.420 | 1.51823 | 58.90 | 0.54567 |
| 14 | 124.20174 | 10.143 | 1.43700 | 95.10 | 0.53364 |
| 15 | −191.30086 | 0.121 | | | |
| *16 | 79.34633 | 5.001 | 1.57135 | 52.95 | 0.55544 |
| 17 | 235.37997 | DD[17] | | | |
| *18 | 115.85199 | 1.000 | 1.90366 | 31.31 | 0.59481 |
| 19 | 29.40782 | 6.645 | | | |
| 20 | −102.25402 | 1.010 | 1.49700 | 81.54 | 0.53748 |
| 21 | 32.87300 | 6.044 | 2.00069 | 25.46 | 0.61364 |
| 22 | 37408.06790 | 3.791 | | | |
| 23 | −46.11695 | 1.530 | 1.80518 | 25.46 | 0.61572 |
| 24 | −40.53811 | 0.710 | 1.80420 | 46.50 | 0.55727 |
| 25 | 282.34052 | DD[25] | | | |
| 26 | 441.55493 | 4.011 | 1.43700 | 95.10 | 0.53364 |
| 27 | −50.68378 | 1.000 | 1.85896 | 22.73 | 0.62844 |
| 28 | −59.20285 | DD[28] | | | |

TABLE 1B

Example 1

| Sn | R | D | Nd | vd | θgF |
|---|---|---|---|---|---|
| 29(St) | ∞ | 1.500 | | | |
| 30 | 180.42526 | 3.011 | 1.88300 | 40.76 | 0.56679 |
| 31 | −179.86390 | 0.123 | | | |
| 32 | 48.47416 | 9.557 | 1.48749 | 70.24 | 0.53007 |
| 33 | −54.22144 | 0.700 | 1.84850 | 43.79 | 0.56197 |
| 34 | 155.61563 | DD[34] | | | |
| 35 | 52.70086 | 7.660 | 1.53775 | 74.70 | 0.53936 |
| 36 | −93.42345 | 0.500 | | | |
| 37 | 376.49838 | 1.200 | 1.84850 | 43.79 | 0.56197 |
| 38 | 37.54054 | 8.010 | 1.84666 | 23.83 | 0.61603 |
| 39 | −203.54192 | 0.202 | | | |
| 40 | 44.31737 | 8.236 | 1.53775 | 74.70 | 0.53936 |
| 41 | −48.22318 | 1.100 | 1.80809 | 22.76 | 0.62868 |
| 42 | 27.18630 | 2.072 | | | |
| 43 | 40.91349 | 11.882 | 1.43700 | 95.10 | 0.53364 |
| 44 | −22.88129 | 1.010 | 1.65412 | 39.68 | 0.57378 |
| 45 | 421.77034 | 4.546 | | | |
| 46 | −123.74098 | 1.010 | 1.71700 | 47.93 | 0.56062 |
| 47 | 93.94119 | 5.347 | 1.80518 | 25.46 | 0.61572 |
| 48 | −106.24164 | 1.000 | | | |
| 49 | ∞ | 2.620 | 1.51680 | 64.20 | 0.53430 |
| 50 | ∞ | 36.395 | | | |

TABLE 2

Example 1

| | WIDE | TELE |
|---|---|---|
| Zr | 1.0 | 3.4 |
| f | 29.075 | 100.309 |
| FNo. | 2.75 | 2.76 |
| 2ω(°) | 79.2 | 25.2 |
| IH | 23.15 | 23.15 |
| DD[17] | 1.411 | 65.032 |
| DD[25] | 1.459 | 1.430 |
| DD[28] | 44.953 | 1.442 |
| DD[34] | 21.629 | 1.548 |

TABLE 3

Example 1

| Sn | 1 | 16 |
|---|---|---|
| KA | 1.0000000E+00 | 1.0000000E+00 |
| A4 | 3.8882182E−07 | −7.4773869E−07 |
| A6 | −9.1897088E−11 | 4.5963301E−11 |
| A8 | 7.9215941E−14 | −1.2202598E−12 |
| A10 | −8.9065753E−17 | 2.9094958E−15 |
| A12 | 8.6174771E−20 | −4.5347348E−18 |
| A14 | −5.3813067E−23 | 4.3917309E−21 |
| A16 | 1.9581146E−26 | −2.6001121E−24 |
| A18 | −3.8281388E−30 | 8.5959666E−28 |
| A20 | 3.1325341E−34 | −1.2158530E−31 |

| Sn | 18 |
|---|---|
| KA | 1.0000000E+00 |
| A4 | 2.1781857E−07 |
| A6 | 5.8392965E−10 |
| A8 | −1.0654439E−12 |
| A10 | 1.5289095E−16 |
| A12 | 3.3523411E−18 |

Figure 3:
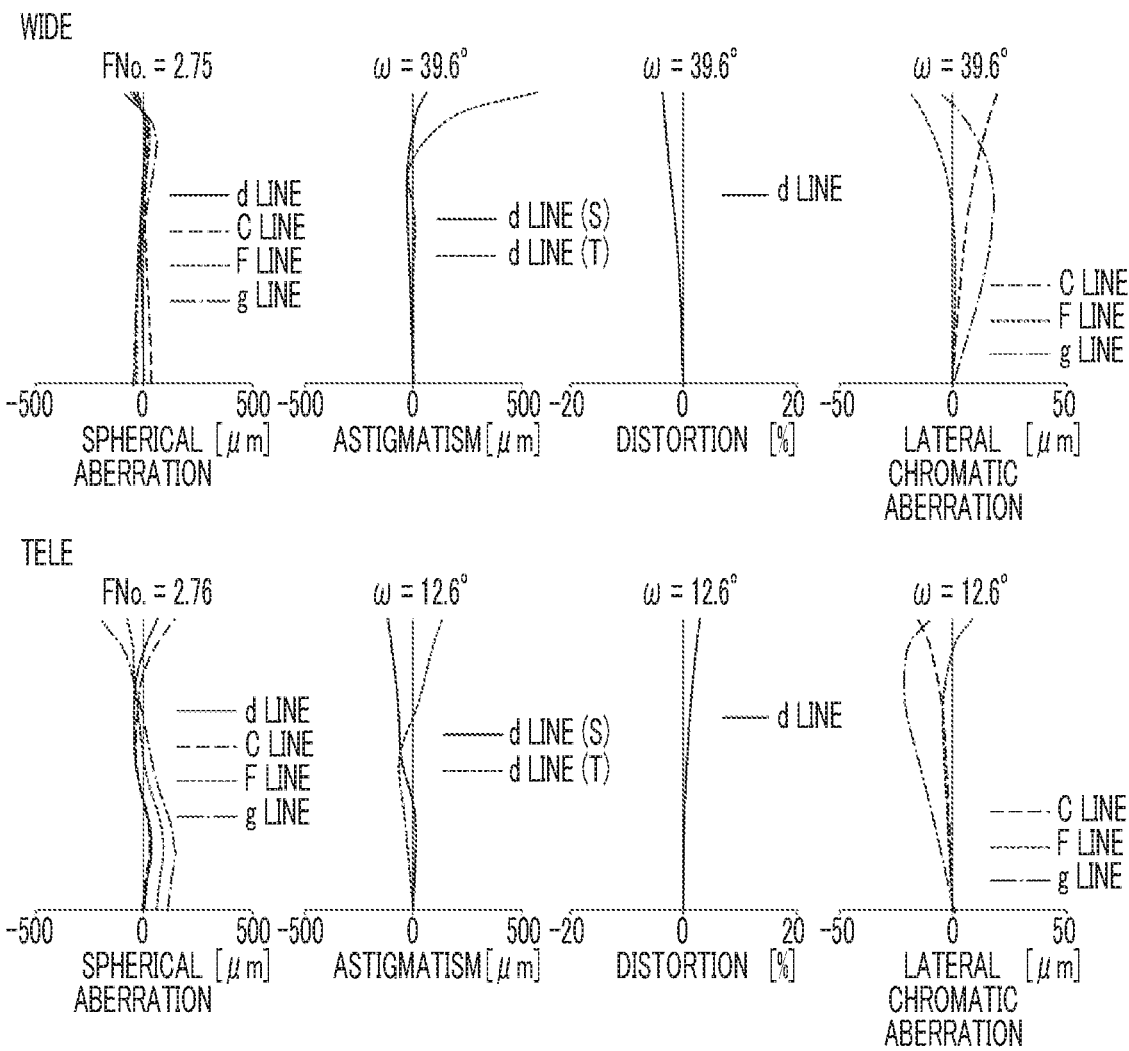
FIG. 3 shows respective aberration diagrams of the zoom lens according to Example 1 of the present disclosure.

FIG. 3 shows an aberration diagram in a state of being focused on an object at infinity through the zoom lens of Example 1. In FIG. 3, in order from a left side, a spherical aberration, an astigmatism, a distortion, and a lateral chromatic aberration are shown. In FIG. 3, an upper part labeled by "WIDE" shows an aberration in a wide-angle end state, and a lower part labeled by "TELE" shows an aberration in a telephoto end state. In the spherical aberration diagram, aberrations at the d line, the C line, the F line, and the g line are indicated by the solid line, the long dashed line, the short dashed line, and the chain line, respectively. In the astigmatism diagram, an aberration in the sagittal direction at the d line is indicated by the solid line, and an aberration in the tangential direction at the d line is indicated by the short dashed line. In the distortion diagram, an aberration at the d line is indicated by the solid line. In the lateral chromatic aberration diagram, aberrations at the C line, the F line, and the g line are respectively indicated by the long dashed line, the short dashed line, and the chain line. In the spherical aberration diagram, FNo. indicates an F number. In other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 4:
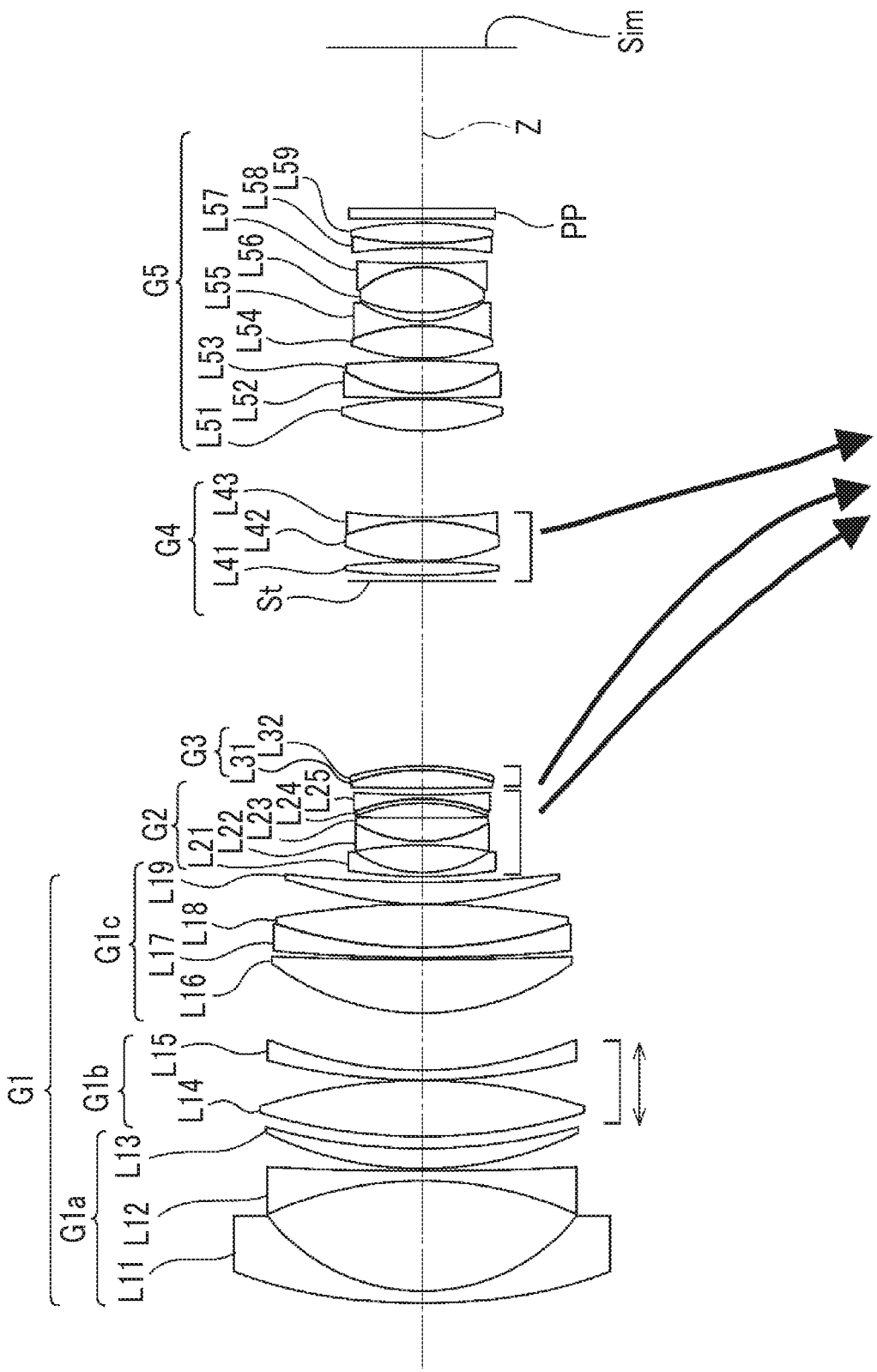
FIG. 4 is a diagram showing a cross-sectional view of a configuration of a zoom lens according to Example 2 of the present disclosure and a movement locus thereof.

FIG. 4 shows a configuration and a movement locus of the zoom lens of Example 2. The zoom lens of Example 2 has the same configuration as the outline of the zoom lens of Example 1. Regarding the zoom lens of Example 2, Tables 4A and 4B show basic lens data thereof, Table 5 shows specification and variable surface distances thereof, Table 6 shows aspheric coefficients thereof, and FIG. 5 shows aberration diagrams thereof.

TABLE 4A

Example 2

| Sn | R | D | Nd | vd | θgF |
|---|---|---|---|---|---|
| *1 | 171.58622 | 2.900 | 1.77250 | 49.60 | 0.55212 |
| 2 | 48.60432 | 26.868 | | | |
| 3 | −92.24749 | 2.399 | 1.55032 | 75.50 | 0.54001 |
| 4 | 794.16247 | 0.539 | | | |
| 5 | 88.58331 | 4.900 | 1.53996 | 59.46 | 0.54418 |
| 6 | 142.91667 | 2.952 | | | |
| 7 | 140.06699 | 13.625 | 1.43700 | 95.10 | 0.53364 |
| 8 | −129.48065 | 0.125 | | | |
| 9 | 155.09605 | 2.399 | 1.84666 | 23.78 | 0.61923 |
| 10 | 99.11860 | 13.898 | | | |
| 11 | 62.26591 | 13.052 | 1.43700 | 95.10 | 0.53364 |
| 12 | 943.90705 | 0.501 | | | |
| 13 | 421.23695 | 2.420 | 1.51823 | 58.90 | 0.54567 |
| 14 | 114.42899 | 10.473 | 1.43700 | 95.10 | 0.53364 |
| 15 | −202.76376 | 0.121 | | | |
| *16 | 80.53034 | 5.290 | 1.57099 | 50.80 | 0.55887 |
| 17 | 291.98535 | DD[17] | | | |
| *18 | 111.49447 | 1.000 | 1.90366 | 31.31 | 0.59481 |
| 19 | 29.39525 | 6.687 | | | |
| 20 | −97.12212 | 1.010 | 1.49700 | 81.54 | 0.53748 |
| 21 | 33.12921 | 5.643 | 2.00069 | 25.46 | 0.61364 |
| 22 | 2505.01645 | 3.554 | | | |
| 23 | −44.46811 | 1.050 | 1.75520 | 27.51 | 0.61033 |
| 24 | −44.87195 | 1.010 | 1.75500 | 52.32 | 0.54757 |
| 25 | 297.80535 | DD[25] | | | |
| 26 | 502.32185 | 4.418 | 1.43700 | 95.10 | 0.53364 |
| 27 | −53.91016 | 1.000 | 1.85896 | 22.73 | 0.62844 |
| 28 | −62.72133 | DD[28] | | | |

TABLE 4B

Example 2

| Sn | R | D | Nd | vd | θgF |
|---|---|---|---|---|---|
| 29(St) | ∞ | 1.500 | | | |
| 30 | 163.51214 | 3.228 | 1.88300 | 40.76 | 0.56679 |
| 31 | −177.57459 | 0.121 | | | |
| 32 | 50.20348 | 9.749 | 1.48749 | 70.24 | 0.53007 |
| 33 | −53.52075 | 1.000 | 1.84850 | 43.79 | 0.56197 |
| 34 | 149.20656 | DD[34] | | | |
| 35 | 51.15807 | 7.640 | 1.55032 | 75.50 | 0.54001 |
| 36 | −92.60719 | 0.248 | | | |
| 37 | 470.64212 | 1.200 | 1.84850 | 43.79 | 0.56197 |
| 38 | 35.76560 | 7.903 | 1.84666 | 23.83 | 0.61603 |
| 39 | −204.26511 | 0.555 | | | |
| 40 | 47.83400 | 8.009 | 1.55032 | 75.50 | 0.54001 |
| 41 | −45.23300 | 1.100 | 1.80809 | 22.76 | 0.62868 |
| 42 | 27.03128 | 2.050 | | | |
| 43 | 38.27639 | 11.072 | 1.43700 | 95.10 | 0.53364 |
| 44 | −23.27462 | 1.010 | 1.67300 | 38.26 | 0.57580 |
| 45 | 347.41025 | 3.766 | | | |
| 46 | −120.65944 | 1.010 | 1.71700 | 47.93 | 0.56062 |
| 47 | 85.26234 | 5.001 | 1.80518 | 25.43 | 0.61027 |
| 48 | −88.10932 | 1.000 | | | |
| 49 | ∞ | 2.620 | 1.51680 | 64.20 | 0.53430 |
| 50 | ∞ | 39.063 | | | |

TABLE 5

Example 2

| | WIDE | TELE |
|---|---|---|
| Zr | 1.0 | 3.4 |
| f | 29.096 | 100.381 |
| FNo. | 2.75 | 2.76 |
| 2ω(°) | 79.2 | 25.2 |
| IH | 23.15 | 23.15 |
| DD[17] | 1.344 | 64.268 |
| DD[25] | 1.600 | 1.587 |
| DD[28] | 44.784 | 1.376 |
| DD[34] | 21.048 | 1.545 |

TABLE 6

Example 2

| Sn | 1 | 16 |
|---|---|---|
| KA | 1.0000000E+00 | 1.0000000E+00 |
| A4 | 3.5933650E−07 | −7.6563146E−07 |
| A6 | −4.8148986E−11 | 1.7616641E−10 |
| A8 | 4.7571920E−14 | −1.7503423E−12 |
| A10 | −8.4335808E−17 | 4.1820116E−15 |
| A12 | 9.4923671E−20 | −6.4623949E−18 |
| A14 | −6.1620585E−23 | 6.2313186E−21 |
| A16 | 2.2789967E−26 | −3.6729283E−24 |
| A18 | −4.5097713E−30 | 1.2086819E−27 |
| A20 | 3.7311725E−34 | −1.7013191E−31 |

| Sn | 18 |
|---|---|
| KA | 1.0000000E+00 |
| A4 | 3.0181759E−07 |
| A6 | −7.7257062E−10 |
| A8 | 6.1416226E−12 |
| A10 | −1.7897192E−14 |
| A12 | 2.1885381E−17 |

Example 3

Figure 6:
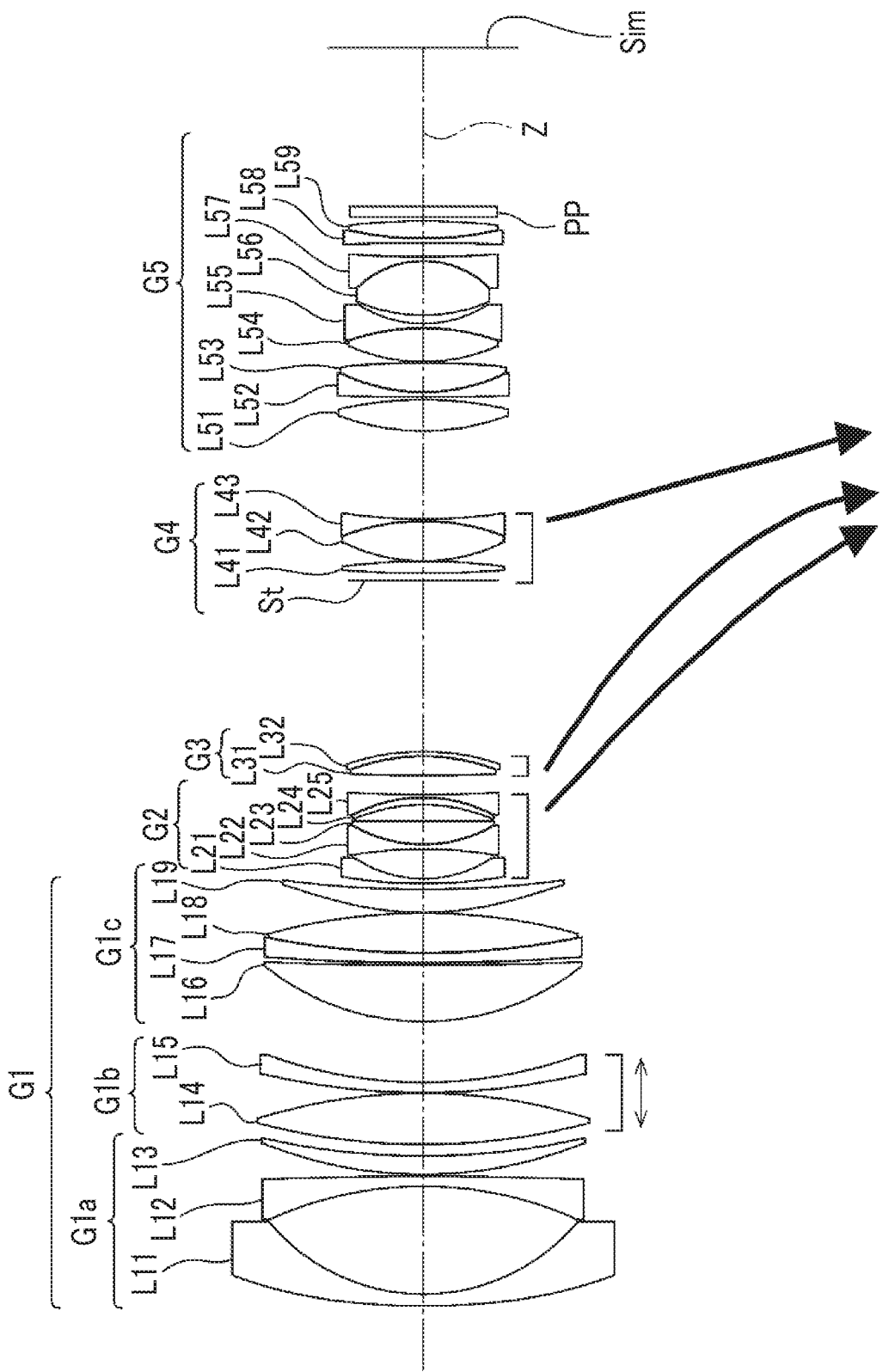
FIG. 6 is a diagram showing a cross-sectional view of a configuration of a zoom lens according to Example 3 of the present disclosure and a movement locus thereof.
Figure 7:
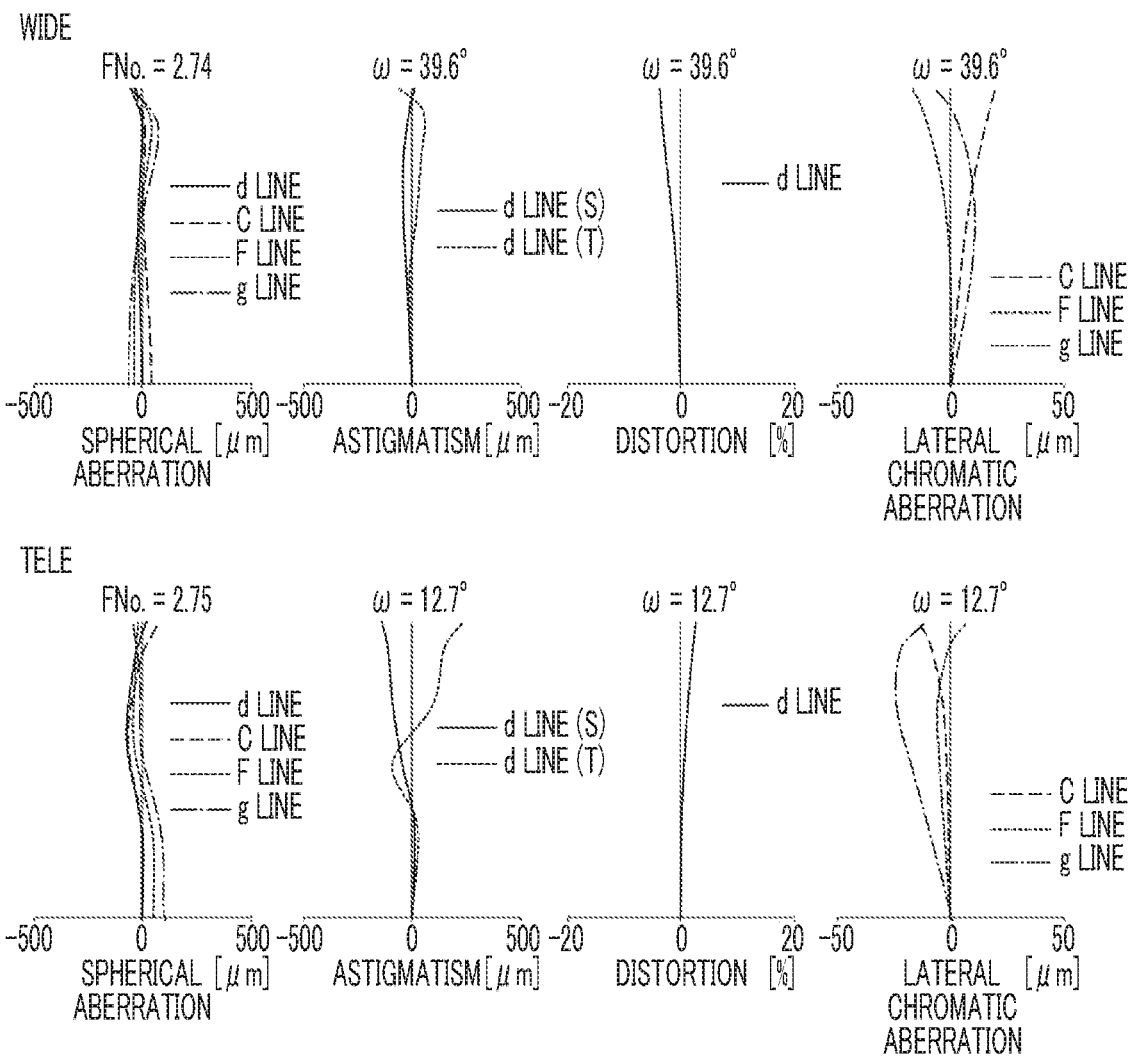
FIG. 7 shows respective aberration diagrams of the zoom lens according to Example 3 of the present disclosure.

FIG. 6 shows a configuration and a movement locus of the zoom lens of Example 3. The zoom lens of Example 3 has the same configuration as the outline of the zoom lens of Example 1. Regarding the zoom lens of Example 3, Tables 7A and 7B show basic lens data thereof, Table 8 shows specification and variable surface distances thereof, Table 9 shows aspheric coefficients thereof, and FIG. 7 shows aberration diagrams thereof.

TABLE 7A

Example 3

| Sn | R | D | Nd | vd | θgF |
|---|---|---|---|---|---|
| *1 | 191.78045 | 2.900 | 1.77250 | 49.60 | 0.55212 |
| 2 | 49.74501 | 26.241 | | | |
| 3 | −92.58733 | 2.400 | 1.61800 | 63.33 | 0.54414 |
| 4 | −1130.51571 | 0.528 | | | |
| 5 | 106.37599 | 4.460 | 1.56732 | 42.84 | 0.57814 |
| 6 | 179.15187 | 2.842 | | | |
| 7 | 163.36873 | 12.490 | 1.43700 | 95.10 | 0.53364 |
| 8 | −137.01357 | 0.130 | | | |
| 9 | 173.88007 | 2.460 | 1.84666 | 23.78 | 0.61923 |
| 10 | 111.63652 | 14.847 | | | |
| 11 | 62.88399 | 13.780 | 1.43700 | 95.10 | 0.53364 |
| 12 | 1082.06862 | 0.562 | | | |
| 13 | 535.23816 | 2.400 | 1.84850 | 43.79 | 0.56197 |
| 14 | 197.48900 | 9.710 | 1.43700 | 95.10 | 0.53364 |
| 15 | −146.18434 | 0.144 | | | |
| *16 | 75.79741 | 5.610 | 1.57099 | 50.80 | 0.55887 |
| 17 | 260.59055 | DD[17] | | | |
| *18 | 120.98200 | 1.190 | 1.90366 | 31.31 | 0.59481 |
| 19 | 30.39833 | 7.220 | | | |
| 20 | −102.70774 | 1.150 | 1.55032 | 75.50 | 0.54001 |
| 21 | 34.67200 | 5.680 | 2.05090 | 26.94 | 0.60519 |
| 22 | ∞ | 3.951 | | | |
| 23 | −43.47989 | 1.780 | 1.75520 | 27.51 | 0.61033 |

TABLE 7A-continued

Example 3

| Sn | R | D | Nd | vd | θgF |
|---|---|---|---|---|---|
| 24 | −36.81800 | 0.710 | 1.75500 | 52.32 | 0.54757 |
| 25 | 328.63635 | DD[25] | | | |
| 26 | 435.59798 | 4.710 | 1.43700 | 95.10 | 0.53364 |
| 27 | −50.07700 | 1.140 | 1.80518 | 25.46 | 0.61572 |
| 28 | −59.18006 | DD[28] | | | |

TABLE 7B

Example 3

| Sn | R | D | Nd | vd | θgF |
|---|---|---|---|---|---|
| 29(St) | ∞ | 1.680 | | | |
| 30 | 250.78233 | 2.900 | 1.89190 | 37.13 | 0.57813 |
| 31 | −160.07896 | 0.118 | | | |
| 32 | 44.93882 | 9.700 | 1.48749 | 70.24 | 0.53007 |
| 33 | −55.70700 | 0.500 | 1.84850 | 43.79 | 0.56197 |
| 34 | 137.68892 | DD[34] | | | |
| 35 | 59.79724 | 7.590 | 1.59349 | 67.00 | 0.53667 |
| 36 | −93.44633 | 0.663 | | | |
| 37 | 920.02516 | 1.200 | 1.84850 | 43.79 | 0.56197 |
| 38 | 46.89400 | 7.150 | 1.84666 | 23.83 | 0.61603 |
| 39 | −199.62733 | 0.243 | | | |
| 40 | 45.04781 | 8.220 | 1.53775 | 74.70 | 0.53936 |
| 41 | −55.70700 | 1.080 | 1.84666 | 23.78 | 0.61923 |
| 42 | 29.26807 | 2.057 | | | |
| 43 | 41.21920 | 13.190 | 1.43700 | 95.10 | 0.53364 |
| 44 | −23.31400 | 1.010 | 1.65412 | 39.68 | 0.57378 |
| 45 | 233.59096 | 3.361 | | | |
| 46 | −637.99182 | 1.140 | 1.71700 | 47.93 | 0.56062 |
| 47 | 83.53500 | 4.220 | 1.80518 | 25.46 | 0.61572 |
| 48 | −165.35896 | 1.000 | | | |
| 49 | ∞ | 2.620 | 1.51680 | 64.20 | 0.53430 |
| 50 | ∞ | 38.591 | | | |

TABLE 8

Example 3

| | WIDE | TELE |
|---|---|---|
| Zr | 1.0 | 3.4 |
| f | 29.022 | 100.124 |
| FNo. | 2.74 | 2.75 |
| 2ω(°) | 79.2 | 25.4 |
| IH | 23.15 | 23.15 |
| DD[17] | 1.442 | 64.241 |
| DD[25] | 4.648 | 1.513 |
| DD[28] | 41.553 | 1.616 |
| DD[34] | 21.503 | 1.776 |

TABLE 9

Example 3

| Sn | 1 | 16 | 18 |
|---|---|---|---|
| KA | 1.0000000E+00 | 1.0000000E+00 | 1.0000000E+00 |
| A4 | 4.3000648E−07 | −7.3930517E−07 | 2.6473383E−07 |
| A6 | −8.2443888E−11 | −1.3102806E−10 | −6.1756994E−10 |
| A8 | 4.3152167E−14 | −2.4791192E−13 | 7.9388612E−12 |
| A10 | −1.8637084E−17 | 1.9703935E−16 | −3.7050620E−14 |
| A12 | 4.7880576E−21 | −1.2514383E−19 | 9.0322833E−17 |
| A14 | −6.0499240E−25 | 2.3601526E−23 | −8.8523756E−20 |
| A16 | 9.5140393E−31 | 4.0913921E−28 | 1.7732453E−25 |
| A18 | 1.3245182E−32 | 6.7513066E−32 | −1.1012843E−27 |
| A20 | −2.2181143E−36 | 2.1146376E−36 | 2.9369501E−33 |

Example 4

Figure 8:
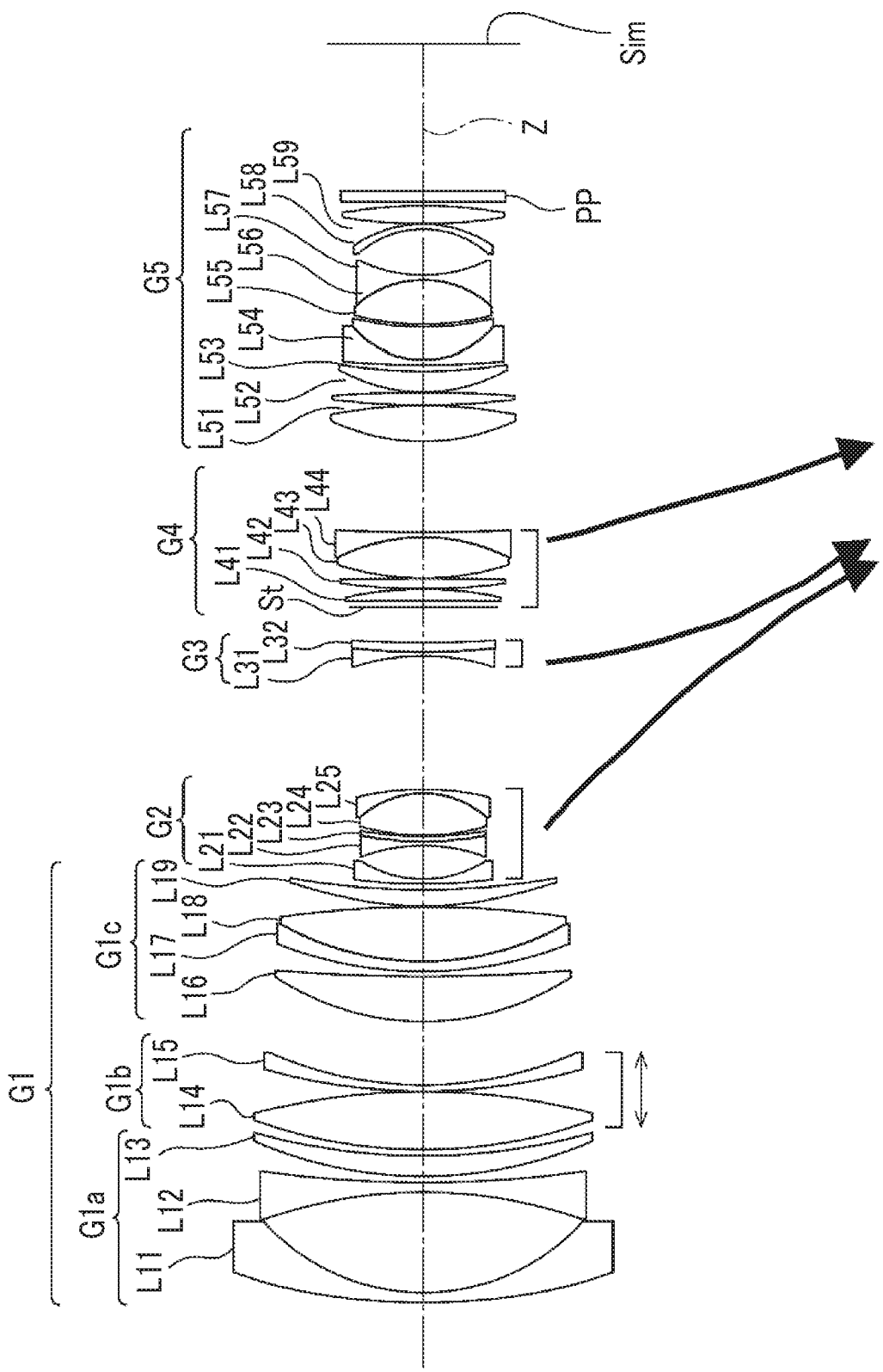
FIG. 8 is a diagram showing a cross-sectional view of a configuration of a zoom lens according to Example 4 of the present disclosure and a movement locus thereof.
Figure 9:
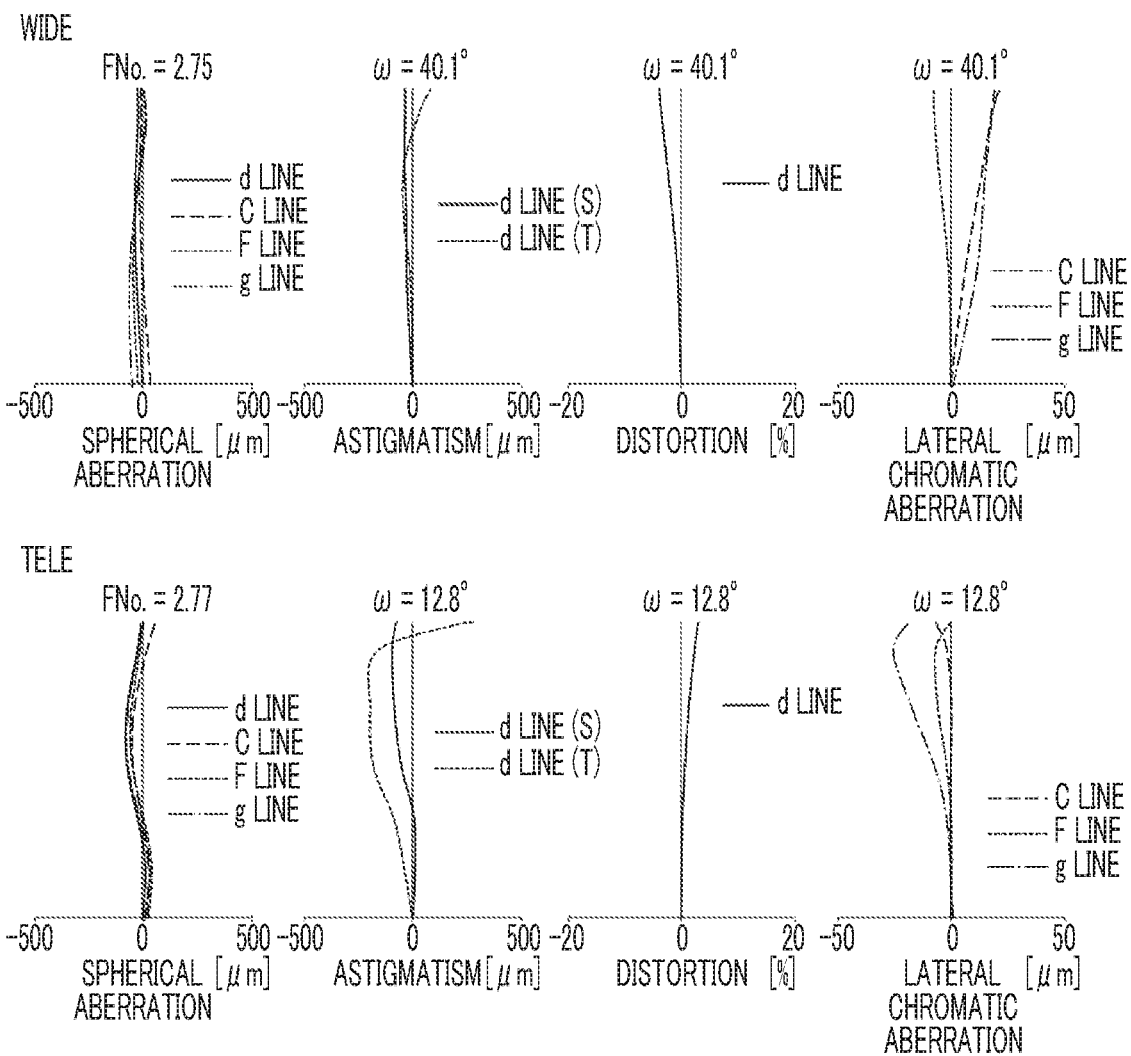
FIG. 9 shows respective aberration diagrams of the zoom lens according to Example 4 of the present disclosure.

FIG. 8 shows a configuration and a movement locus of the zoom lens of Example 4. The zoom lens of Example 4 has the same configuration as the outline of the zoom lens of Example 1 except that the third lens group G3 has a negative refractive power and the fourth lens group G4 consists of an aperture stop St and four lenses L41 to L44 in order from an object side to an image side. Regarding the zoom lens of Example 4, Tables 10A and 10B show basic lens data thereof, Table 11 shows specification and variable surface distances thereof, Table 12 shows aspheric coefficients thereof, and FIG. 9 shows aberration diagrams thereof.

TABLE 10A

Example 4

| Sn | R | D | Nd | vd | θgF |
|---|---|---|---|---|---|
| *1 | 179.40446 | 2.401 | 1.80610 | 33.27 | 0.58845 |
| 2 | 53.12829 | 24.423 | | | |
| 3 | −118.61394 | 2.400 | 1.61800 | 63.33 | 0.54414 |
| 4 | 297.65197 | 1.476 | | | |
| 5 | 104.98393 | 4.999 | 1.85478 | 24.80 | 0.61232 |
| 6 | 156.30951 | 1.491 | | | |
| 7 | 124.08605 | 14.124 | 1.43700 | 95.10 | 0.53364 |
| 8 | −165.27881 | 0.120 | | | |
| 9 | 145.94039 | 1.500 | 1.80518 | 25.46 | 0.61572 |
| 10 | 94.45591 | 15.234 | | | |
| 11 | 66.28029 | 10.971 | 1.43700 | 95.10 | 0.53364 |
| 12 | 459.46902 | 1.199 | | | |
| 13 | 99.05893 | 2.419 | 1.56732 | 42.82 | 0.57309 |
| 14 | 71.59016 | 13.255 | 1.43700 | 95.10 | 0.53364 |
| 15 | −258.08644 | 0.200 | | | |
| *16 | 81.42063 | 4.000 | 1.59551 | 39.24 | 0.58043 |
| 17 | 189.05194 | DD[17] | | | |
| *18 | 144.97847 | 1.200 | 1.77250 | 49.60 | 0.55212 |
| 19 | 28.55789 | 8.123 | | | |
| 20 | −43.47029 | 1.010 | 1.59282 | 68.62 | 0.54414 |
| 21 | 78.74006 | 1.301 | 2.00100 | 29.13 | 0.59952 |
| 22 | 92.67835 | 0.200 | | | |
| 23 | 55.69741 | 10.209 | 1.71736 | 29.52 | 0.60483 |
| 24 | −23.46498 | 1.000 | 2.00100 | 29.13 | 0.59952 |
| 25 | −68.73935 | DD[25] | | | |
| 26 | −56.13694 | 1.009 | 1.49700 | 81.54 | 0.53748 |
| 27 | 168.95596 | 2.249 | 1.89286 | 20.36 | 0.63944 |
| 28 | 282.07846 | DD[28] | | | |

TABLE 10B

Example 4

| Sn | R | D | Nd | vd | θgF |
|---|---|---|---|---|---|
| 29(St) | ∞ | 1.484 | | | |
| 30 | −1404.19230 | 2.799 | 1.91082 | 35.25 | 0.58224 |
| 31 | −91.67441 | 0.119 | | | |
| 32 | 151.78541 | 2.456 | 1.59282 | 68.62 | 0.54414 |
| 33 | −1033.62353 | 0.120 | | | |
| 34 | 69.35987 | 9.964 | 1.59282 | 68.62 | 0.54414 |
| 35 | −46.83861 | 1.199 | 1.84850 | 43.79 | 0.56197 |
| 36 | 419.78193 | DD[36] | | | |
| 37 | 53.91977 | 8.686 | 1.43700 | 95.10 | 0.53364 |
| 38 | −120.81720 | 0.120 | | | |
| 39 | 181.74734 | 3.076 | 1.85896 | 22.73 | 0.62844 |
| 40 | −340.11411 | 0.120 | | | |
| 41 | 42.06962 | 5.049 | 1.62041 | 60.29 | 0.54266 |
| 42 | 134.06504 | 1.508 | | | |
| 43 | 246.84465 | 1.200 | 1.91082 | 35.25 | 0.58224 |
| 44 | 22.29736 | 7.920 | 1.58913 | 61.13 | 0.54067 |
| 45 | 72.11072 | 0.603 | | | |
| 46 | 66.34603 | 10.805 | 1.72916 | 54.68 | 0.54451 |
| 47 | −24.77020 | 1.200 | 1.85883 | 30.00 | 0.59793 |
| 48 | 36.46723 | 11.137 | | | |
| 49 | −24.14321 | 1.199 | 1.80518 | 25.46 | 0.61572 |

TABLE 10B-continued

Example 4

| Sn | R | D | Nd | vd | θgF |
|---|---|---|---|---|---|
| 50 | −30.40404 | 0.120 | | | |
| 51 | 123.45783 | 4.380 | 1.80518 | 25.46 | 0.61572 |
| 52 | −116.53619 | 1.000 | | | |
| 53 | ∞ | 2.620 | 1.51680 | 64.20 | 0.53430 |
| 54 | ∞ | 35.771 | | | |

TABLE 11

Example 4

| | WIDE | TELE |
|---|---|---|
| Zr | 1.0 | 3.4 |
| f | 28.988 | 100.007 |
| FNo. | 2.75 | 2.77 |
| 2ω(°) | 80.2 | 25.6 |
| IH | 23.15 | 23.15 |
| DD[17] | 1.418 | 58.456 |
| DD[25] | 32.446 | 2.807 |
| DD[28] | 8.706 | 1.917 |
| DD[36] | 22.136 | 1.526 |

TABLE 12

Example 4

| Sn | 1 |
|---|---|
| KA | 1.0000000E+00 |
| A3 | 0.0000000E+00 |
| A4 | 4.5312022E−07 |
| A5 | −2.1153428E−08 |
| A6 | 1.2109683E−09 |
| A7 | −3.5047863E−11 |
| A8 | 3.2995463E−13 |
| A9 | 7.4716711E−15 |
| A10 | −2.5204068E−16 |
| A11 | 3.2023101E−18 |
| A12 | −6.5183205E−20 |
| A13 | 2.5926591E−21 |
| A14 | −5.9075748E−23 |
| A15 | 6.5226625E−25 |
| A16 | −2.8380994E−27 |

| Sn | 16 | 18 |
|---|---|---|
| KA | 1.0000000E+00 | 1.0000000E+00 |
| A3 | −3.6590163E−07 | 2.4032717E−06 |
| A4 | −7.7052676E−07 | 1.5176659E−06 |
| A5 | 1.7642298E−08 | −1.2061942E−07 |
| A6 | −1.5100805E−09 | 2.0321330E−08 |
| A7 | 5.4051346E−11 | −1.5276666E−09 |
| A8 | −1.4701374E−12 | 7.7626452E−11 |
| A9 | 2.2899010E−14 | −2.6505983E−12 |
| A10 | −1.9240653E−16 | 5.2198549E−14 |

Example 5

Figure 10:
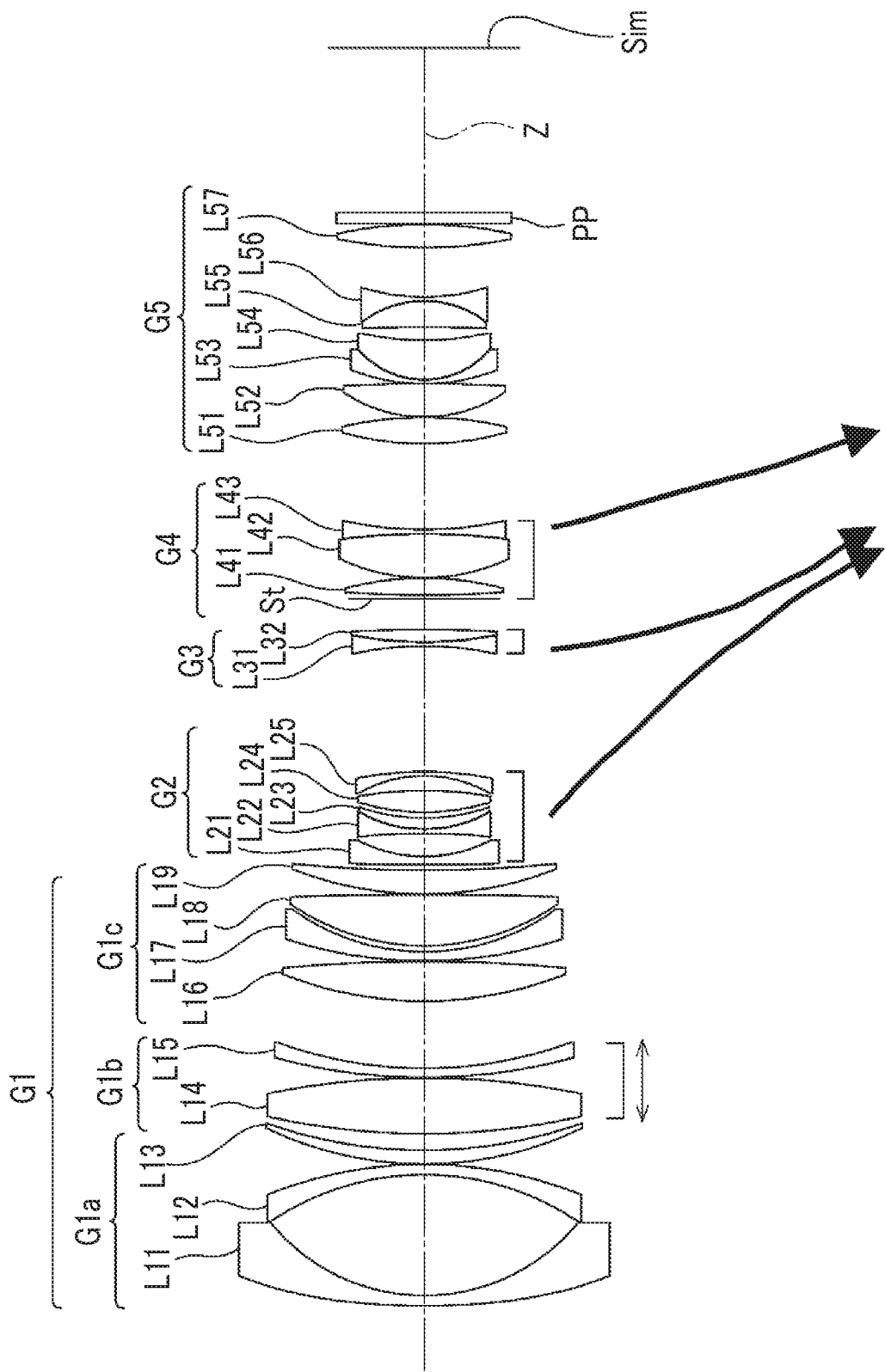
FIG. 10 is a diagram showing a cross-sectional view of a configuration of a zoom lens according to Example 5 of the present disclosure and a movement locus thereof.
Figure 11:
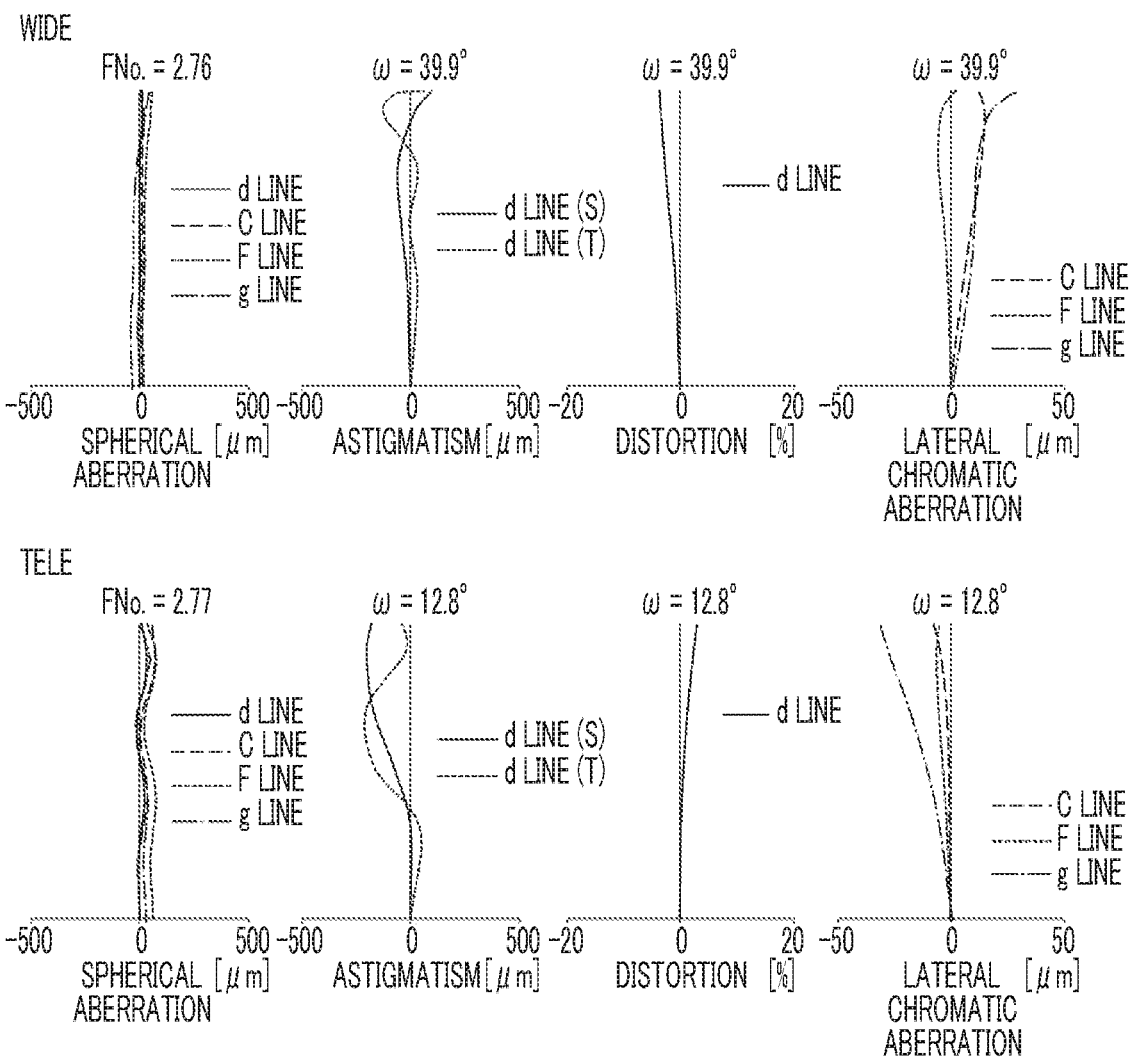
FIG. 11 shows respective aberration diagrams of the zoom lens according to Example 5 of the present disclosure.

FIG. 10 shows a configuration and a movement locus of the zoom lens of Example 5. The zoom lens of Example 5 has the same configuration as the outline of the zoom lens of Example 1 except that the third lens group G3 has a negative refractive power and the fifth lens group G5 consists of seven lenses L51 to L57 in order from an object side to an image side. Regarding the zoom lens of Example 5, Tables 13A and 13B show basic lens data thereof, Table 14 shows specification and variable surface distances thereof, Table 15 shows aspheric coefficients thereof, and FIG. 11 shows aberration diagrams thereof.

TABLE 13A

Example 5

| Sn | R | D | Nd | vd | θgF |
|---|---|---|---|---|---|
| *1 | 186.61165 | 2.500 | 1.84850 | 43.79 | 0.56197 |
| 2 | 48.99543 | 29.390 | | | |
| 3 | −68.26202 | 2.500 | 1.69560 | 59.05 | 0.54348 |
| 4 | −104.05394 | 0.121 | | | |
| 5 | 90.38693 | 3.358 | 1.85896 | 22.73 | 0.62844 |
| 6 | 116.98126 | 3.999 | | | |
| 7 | 177.12494 | 13.588 | 1.49700 | 81.54 | 0.53748 |
| 8 | −194.81898 | 0.120 | | | |
| 9 | 141.59167 | 2.200 | 1.89286 | 20.36 | 0.63944 |
| 10 | 105.26390 | 16.399 | | | |
| 11 | 95.23834 | 9.658 | 1.43875 | 94.66 | 0.53402 |
| 12 | −368.34863 | 0.120 | | | |
| 13 | 111.14631 | 2.200 | 1.84666 | 23.78 | 0.62054 |
| 14 | 55.64903 | 1.499 | | | |
| 15 | 58.23785 | 12.444 | 1.43875 | 94.66 | 0.53402 |
| 16 | −901.67433 | 0.120 | | | |
| 17 | 89.40339 | 5.788 | 1.92119 | 23.96 | 0.62025 |
| 18 | 335.92588 | DD[18] | | | |
| *19 | 2745.44569 | 2.000 | 1.90366 | 31.31 | 0.59481 |
| 20 | 35.33679 | 5.629 | | | |
| 21 | −149.83833 | 1.010 | 1.59410 | 60.47 | 0.55516 |
| 22 | 32.26181 | 2.726 | 1.95375 | 32.32 | 0.59015 |
| 23 | 48.79556 | 1.421 | | | |
| 24 | 54.70973 | 5.204 | 1.85025 | 30.05 | 0.59797 |
| 25 | −97.73995 | 3.628 | | | |
| 26 | −32.27393 | 1.000 | 1.69560 | 59.05 | 0.54348 |
| 27 | −85.92500 | DD[27] | | | |
| 28 | −82.95613 | 1.001 | 1.95375 | 32.32 | 0.59015 |
| 29 | 93.48855 | 3.016 | 1.89286 | 20.36 | 0.63944 |
| 30 | −371.78593 | DD[30] | | | |

TABLE 13B

Example 5

| Sn | R | D | Nd | vd | θgF |
|---|---|---|---|---|---|
| 31(St) | ∞ | 1.000 | | | |
| *32 | 256.58787 | 4.081 | 1.95375 | 32.32 | 0.59015 |
| 33 | −76.93654 | 0.120 | | | |
| 34 | 48.92160 | 10.686 | 1.55032 | 75.50 | 0.54001 |
| 35 | −153.83415 | 1.000 | 1.88300 | 40.69 | 0.56730 |
| 36 | 90.78891 | DD[36] | | | |
| 37 | 75.84018 | 6.377 | 1.48749 | 70.24 | 0.53007 |
| 38 | −90.18326 | 0.121 | | | |
| 39 | 35.39937 | 8.061 | 1.43875 | 94.66 | 0.53402 |
| 40 | −408.25320 | 0.011 | | | |
| 41 | 48.83024 | 1.000 | 1.95375 | 32.32 | 0.59015 |
| 42 | 21.18049 | 9.594 | 1.53172 | 48.84 | 0.56309 |
| 43 | 69.62866 | 3.170 | | | |
| 44 | −555.38702 | 6.373 | 1.59522 | 67.73 | 0.54426 |
| 45 | −24.97738 | 1.000 | 1.96300 | 24.11 | 0.62126 |
| 46 | 52.40053 | 12.000 | | | |
| 47 | 107.62256 | 5.661 | 1.89286 | 20.36 | 0.63944 |
| 48 | −100.65637 | 0.200 | | | |
| 49 | ∞ | 2.620 | 1.51633 | 64.14 | 0.53531 |
| 50 | ∞ | 40.102 | | | |

TABLE 14

Example 5

| | WIDE | TELE |
|---|---|---|
| Zr | 1.0 | 3.4 |
| f | 29.038 | 100.180 |
| FNo. | 2.76 | 2.77 |
| 2ω(°) | 79.8 | 25.6 |
| IH | 23.15 | 23.15 |
| DD[18] | 1.352 | 55.377 |
| DD[27] | 30.331 | 1.958 |

TABLE 14-continued

Example 5

| | WIDE | TELE |
|---|---|---|
| DD[30] | 7.453 | 1.201 |
| DD[36] | 20.921 | 1.520 |

TABLE 15

Example 5

| Sn | 1 | 19 |
|---|---|---|
| KA | 1.0000000E+00 | 1.0000000E+00 |
| A3 | 0.0000000E+00 | 0.0000000E+00 |
| A4 | 4.2850223E−07 | 1.9905763E−06 |
| A5 | −3.1135083E−08 | 1.5535514E−08 |
| A6 | 5.4891353E−09 | −3.2525521E−09 |
| A7 | −5.2328503E−10 | −1.9324040E−10 |
| A8 | 3.4983921E−11 | 9.2702095E−12 |
| A9 | −1.7979915E−12 | 1.8556089E−11 |
| A10 | 6.9269257E−14 | −1.7129447E−12 |
| A11 | −1.8152401E−15 | −1.4345781E−13 |
| A12 | 2.6605160E−17 | 2.7514910E−14 |
| A13 | −4.7750137E−20 | −1.3271973E−15 |
| A14 | −5.2589462E−21 | 1.1281959E−17 |
| A15 | 8.1692857E−23 | 7.9822695E−19 |
| A16 | −4.0575361E−25 | −1.6732247E−20 |
| A17 | −2.2317454E−30 | 0.0000000E+00 |
| A18 | −2.8054348E−32 | 0.0000000E+00 |
| A19 | 5.8459684E−34 | 0.0000000E+00 |
| A20 | 6.2578690E−36 | 0.0000000E+00 |

| Sn | 32 |
|---|---|
| KA | 1.0000000E+00 |
| A4 | −9.6245891E−07 |
| A6 | −1.4380540E−09 |
| A8 | 2.5394744E−11 |
| A10 | −2.4737707E−13 |
| A12 | 1.4389602E−15 |
| A14 | −5.1676940E−18 |
| A16 | 1.1221112E−20 |
| A18 | −1.3506704E−23 |
| A20 | 6.9189754E−27 |

Table 16 shows values corresponding to Conditional Expressions (1) to (8) of the zoom lenses of Examples 1 to 5. The values shown in Table 16 are based on the d line.

TABLE 16

| Expression No. | | Example 1 | Example 2 | Example 3 | Example 4 | Example 5 |
|---|---|---|---|---|---|---|
| (1) | $0.00816 \times \nu p - 2.040724 + Np$ | 0.168 | 0.168 | 0.230 | 0.198 | 0.177 |
| (2) | $\nu n$ | 81.54 | 81.54 | 75.50 | 68.62 | 60.47 |
| (3) | $Np$ | 2.00069 | 2.00069 | 2.05090 | 2.00100 | 1.95375 |
| (4) | $\nu p$ | 25.46 | 25.46 | 26.94 | 29.13 | 32.32 |
| (5) | $1/\beta 4$ | −0.06 | −0.05 | −0.08 | −0.01 | −0.03 |
| (6) | $f2/fw$ | −0.96 | −0.97 | −0.96 | −1.38 | −1.27 |
| (7) | $f1/f2$ | −2.87 | −2.81 | −2.84 | −1.87 | −1.85 |
| (8) | $f1c/f2$ | −2.68 | −2.62 | −2.66 | −1.73 | −2.05 |

As can be seen from the data described above, the zoom lenses of Examples 1 to 5 have a maximum image height of 23.15 and a large image circle while being downsized, and realize high optical performance with various aberrations, including a lateral chromatic aberration, which are favorably suppressed.

Figure 12:
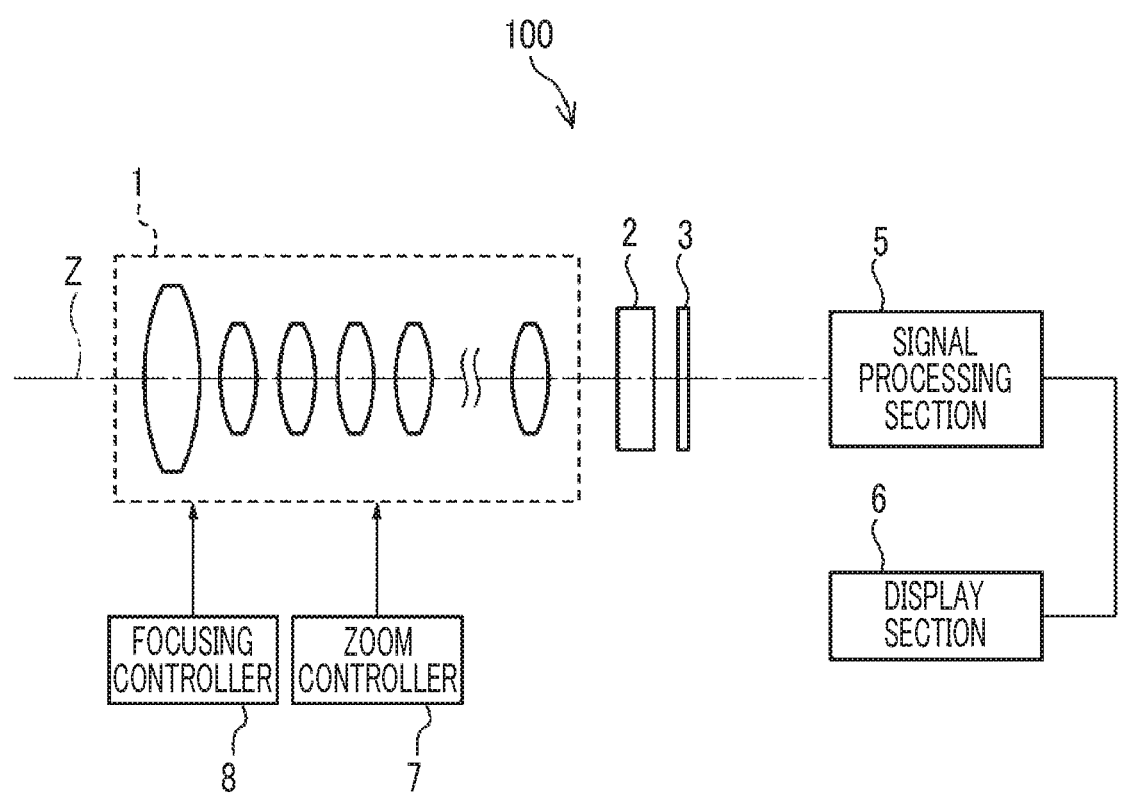
FIG. 12 is a schematic configuration diagram of an imaging apparatus according to an embodiment of the present disclosure.

Next, an imaging apparatus according to an embodiment of the present disclosure will be described. FIG. 12 is a schematic configuration diagram of an imaging apparatus 100 using the zoom lens 1 according to the above-mentioned embodiment of the present disclosure as an example of an imaging apparatus of an embodiment of the present disclosure. Examples of the imaging apparatus 100 include a broadcast camera, a movie camera, a video camera, a surveillance camera, and the like.

The imaging apparatus 100 comprises the zoom lens 1, a filter 2 disposed on an image side of the zoom lens 1, and an imaging element 3 disposed on an image side of the filter 2. Further, FIG. 12 schematically shows a plurality of lenses included in the zoom lens 1.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with an image plane of the zoom lens 1.

The imaging apparatus 100 also comprises a signal processing section 5 that performs arithmetic processing on an output signal from the imaging element 3, a display section 6 that displays an image formed by the signal processing section 5, a zoom controller 7 that controls zooming of the zoom lens 1, and a focusing controller 8 that controls focusing of the zoom lens 1. Although only one imaging element 3 is shown in FIG. 12, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the distance between surfaces, the refractive index, the Abbe number, and the aspheric coefficients of each lens are not limited to the values shown in the numerical examples, and different values may be used therefor.

What is claimed is:

1. A zoom lens consisting of, in order from an object side to an image side:
   a first lens group that has a positive refractive power;
   a second lens group that has a negative refractive power;
   a third lens group that has a refractive power;
   a fourth lens group that has a positive refractive power; and
   a fifth lens group that has a positive refractive power,
   wherein during zooming from a wide-angle end to a telephoto end, the first lens group and the fifth lens group remain stationary with respect to an image plane, the second lens group moves to an image side, and the third lens group and the fourth lens group move along an optical axis while changing a distance with each of adjacent lens groups, wherein the second lens group has, successively in order from a most object side to an image side, a negative lens and a cemented lens, wherein the cemented lens has, successively in order from an object side to an image side, a first negative lens and a first positive lens, and wherein assuming that a refractive index of the first positive lens with respect to a d line is Np and an Abbe number of the first positive lens based on a d line is vp, the following Conditional Expression (1) is satisfied, $$0.05 < 0.00816 \times vp - 2.040724 + Np < 0.5 \quad (1).$$

2. The zoom lens according to claim 1,
wherein assuming that an Abbe number of the first negative lens based on a d line is vn, the following Conditional Expression (2) is satisfied, $$60 < vn < 105 \quad (2).$$

3. The zoom lens according to claim 2,
wherein the following Conditional Expression (2-1) is satisfied, $$65 < vn < 100 \quad (2-1).$$

4. The zoom lens according to claim 1,
wherein the following Conditional Expression (3) is satisfied, $$1.9 < Np < 2.2 \quad (3).$$

5. The zoom lens according to claim 4,
wherein the following Conditional Expression (3-1) is satisfied, $$1.95 < Np < 2.2 \quad (3-1).$$

6. The zoom lens according to claim 1,
wherein the following Conditional Expression (4) is satisfied, $$25 < vp < 60 \quad (4).$$

7. The zoom lens according to claim 6,
wherein the following Conditional Expression (4-1) is satisfied, $$26.5 < vp < 60 \quad (4-1).$$

8. The zoom lens according to claim 1,
wherein a stop is disposed in the fourth lens group, and
wherein a distance between the fourth lens group and the fifth lens group at a wide-angle end is longer than a distance between the fourth lens group and the fifth lens group at a telephoto end.

9. The zoom lens according to claim 8,
wherein assuming that a lateral magnification of the fourth lens group in a state of being focused on an object at infinity is β4, the following Conditional Expression (5) is satisfied, $$-0.3 < 1/\beta 4 < 0 \quad (5).$$

10. The zoom lens according to claim 9,
wherein the following Conditional Expression (5-1) is satisfied, $$-0.2 < 1/\beta 4 < 0 \quad (5-1).$$

11. The zoom lens according to claim 1,
wherein in a state of being focused on an object at infinity, assuming that a focal length of the second lens group is f2 and a focal length of the zoom lens at a wide-angle end is fw, the following Conditional Expression (6) is satisfied, $$-3 < f2/fw < 0 \quad (6).$$

12. The zoom lens according to claim 11,
wherein the following Conditional Expression (6-1) is satisfied, $$-2.5 < f2/fw < -0.5 \quad (6-1).$$

13. The zoom lens according to claim 1,
wherein in a state of being focused on an object at infinity, assuming that a focal length of the first lens group is f1 and a focal length of the second lens group is f2, the following Conditional Expression (7) is satisfied, $$-5 < f1/f2 < 0 \quad (7).$$

14. The zoom lens according to claim 13,
wherein the following Conditional Expression (7-1) is satisfied, $$-4 < f1/f2 < -0.5 \quad (7-1).$$

15. The zoom lens according to claim 1,
wherein the first lens group consists of, in order from an object side to an image side, a first a lens group that remains stationary with respect to an image plane during focusing and has a negative refractive power, a first b lens group that moves along an optical axis during focusing and has a positive refractive power, and a first c lens group that remains stationary with respect to an image plane during focusing and has a positive refractive power.

16. The zoom lens according to claim 15,
wherein assuming that a focal length of the first c lens group is f1c and a focal length of the second lens group is f2, the following Conditional Expression (8) is satisfied, $$-5 < f1c/f2 < 0 \quad (8).$$

17. The zoom lens according to claim 16,
wherein the following Conditional Expression (8-1) is satisfied, $$-4 < f1c/f2 < -0.5 \quad (8-1).$$

18. The zoom lens according to claim 1,
wherein the following Conditional Expression (1-1) is satisfied, $$0.1 < 0.00816 \times vp - 2.040724 + Np < 0.4 \quad (1-1).$$

19. An imaging apparatus comprising the zoom lens according to claim 1.

* * * * *